United States Patent
Nakano et al.

(10) Patent No.: US 7,957,035 B2
(45) Date of Patent: Jun. 7, 2011

(54) TRANSPORT AMOUNT CORRECTING METHOD, RECORDING APPARATUS, AND STORAGE MEDIUM HAVING PROGRAM STORED THEREON

(75) Inventors: Tatsuya Nakano, Hata-machi (JP); Masahiko Yoshida, Shiojiri (JP); Bunji Ishimoto, Matsumoto (JP); Toru Miyamoto, Shiojiri (JP); Hirokazu Nunokawa, Matsumoto (JP); Yoichi Kakehashi, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 956 days.

(21) Appl. No.: 11/892,617

(22) Filed: Aug. 24, 2007

(65) Prior Publication Data

US 2008/0049261 A1    Feb. 28, 2008

(30) Foreign Application Priority Data

Aug. 25, 2006 (JP) ................. 2006-229453

(51) Int. Cl.
*H04N 1/21* (2006.01)
*A01K 31/20* (2006.01)
(52) U.S. Cl. .......... 358/296; 358/1.9; 358/1.8; 358/502; 347/14; 347/19
(58) Field of Classification Search ............ 358/1.8, 358/3.24, 3.26, 502, 1.9, 594, 296, 1.2; 399/394–396; 347/12–19, 40, 43; 271/272, 271/275, 314
See application file for complete search history.

(56) References Cited

U.S. PATENT DOCUMENTS

| | | | | |
|---|---|---|---|---|
| 5,887,126 | A * | 3/1999 | Fujimoto | 358/1.12 |
| 6,908,173 | B2 * | 6/2005 | Otsuki et al. | 347/19 |
| 6,938,977 | B2 * | 9/2005 | Corbin et al. | 347/19 |
| 7,197,254 | B2 * | 3/2007 | Tomita et al. | 399/49 |
| 7,571,978 | B2 * | 8/2009 | Nakano et al. | 347/19 |
| 7,578,571 | B2 * | 8/2009 | Nakano et al. | 347/19 |
| 2001/0053300 | A1 * | 12/2001 | Endo et al. | 399/394 |
| 2008/0049353 | A1 * | 2/2008 | Nakano et al. | 360/69 |
| 2009/0179933 | A1 * | 7/2009 | Otsuki | 347/14 |

FOREIGN PATENT DOCUMENTS

JP   05-96796 A   4/1993
JP   2003-11345 A   1/2003

* cited by examiner

*Primary Examiner* — Twyler L Haskins
*Assistant Examiner* — Dennis Dicker
(74) *Attorney, Agent, or Firm* — Sughrue Mion, PLLC

(57) ABSTRACT

A transport amount correcting method, including: (A) storing in a memory, in regard to a medium of a predetermined size, correction values associated with relative positions of the medium and a head; and (B) when carrying out recording on the medium of the predetermined size, transporting the medium while correcting a target transport amount using a correction value associated with a relative position of the medium and the head, and when carrying out recording on a medium smaller than the predetermined size, transporting the medium while correcting the target transport amount by not using a portion of the correction values, the portion of the correction values being a portion of the correction values among the correction values used when the medium of the predetermined size is being transported by both an upstream side roller and a downstream side roller.

11 Claims, 32 Drawing Sheets

(LINE INTERVAL: 36 DPI)

| CENTROID POSITION OF LINES IN STANDARD PATTERN | CENTROID POSITION OF LINES IN MEASUREMENT PATTERN |
|---|---|
| 150.517188 | |
| 309.61325 | 373.7686667 |
| 469.430413 | |
| 629.784845 | |
| 789.430540 | |
| 948.516717 | |
| 1108.78578 | |
| 1268.46733 | |
| 1427.61466 | |
| 1588.40063 | |
| 1748.53450 | |
| 1907.85035 | |
| 2068.77973 | |
| 2229.55093 | |
| 2389.35303 | |
| 2549.73869 | |
| 2710.57874 | |
| 2869.85372 | |
| 3030.30513 | |
| 3190.58349 | 3248.683.34 |
| 3349.64221 | |
| 3508.76310 | |
| ⋮ | ⋮ |

FIG. 19

| CORRECTION VALUE | BORDER POSITION INFORMATION |
|---|---|
| Ca(1) | THEORETICAL POSITION CORRESPONDING TO L2 |
| Ca(2) | THEORETICAL POSITION CORRESPONDING TO L3 |
| Ca(3) | THEORETICAL POSITION CORRESPONDING TO L4 |
| ⋮ | ⋮ |
| Ca(19) | THEORETICAL POSITION CORRESPONDING TO L20 |
| Cb | — |

| CORRECTION VALUE | BORDER POSITION INFORMATION |
|---|---|
| Ca(1) | THEORETICAL POSITION CORRESPONDING TO L2 |
| Ca(2) | THEORETICAL POSITION CORRESPONDING TO L3 |
| Ca(3) | THEORETICAL POSITION CORRESPONDING TO L4 |
| ⋮ | ⋮ |
| Ca(38) | THEORETICAL POSITION CORRESPONDING TO L39 |
| Cb | — |

FIG. 25

| CORRECTION VALUE | BORDER POSITION INFORMATION |
|---|---|
| Ca(1) | THEORETICAL POSITION CORRESPONDING TO L2 |
| Ca(2) | THEORETICAL POSITION CORRESPONDING TO L3 |
| ⋮ | ⋮ |
| Ca(10) | THEORETICAL POSITION CORRESPONDING TO L11 |
| Ca(19) | THEORETICAL POSITION CORRESPONDING TO L12 |
| Ca(20) | THEORETICAL POSITION CORRESPONDING TO L13 |
| ⋮ | ⋮ |
| Ca(38) | THEORETICAL POSITION CORRESPONDING TO L31 |
| Cb | — |

FIG. 28

| CORRECTION VALUE | BORDER POSITION INFORMATION |
|---|---|
| Ca(1) | THEORETICAL POSITION CORRESPONDING TO L2 |
| Ca(2) | THEORETICAL POSITION CORRESPONDING TO L3 |
| ⋮ | ⋮ |
| Ca(12) | THEORETICAL POSITION CORRESPONDING TO L13 |
| Ca(13) | THEORETICAL POSITION CORRESPONDING TO L14 |
| Ca(14) | THEORETICAL POSITION CORRESPONDING TO L15 |
| Ca(14) | THEORETICAL POSITION CORRESPONDING TO L16 |
| Ca(14) | THEORETICAL POSITION CORRESPONDING TO L17 |
| Ca(14) | THEORETICAL POSITION CORRESPONDING TO L18 |
| Ca(14) | THEORETICAL POSITION CORRESPONDING TO L19 |
| Ca(14) | THEORETICAL POSITION CORRESPONDING TO L20 |
| Ca(14) | THEORETICAL POSITION CORRESPONDING TO L21 |
| Ca(14) | THEORETICAL POSITION CORRESPONDING TO L22 |
| Ca(15) | THEORETICAL POSITION CORRESPONDING TO L23 |
| Ca(16) | THEORETICAL POSITION CORRESPONDING TO L24 |
| ⋮ | ⋮ |
| Ca(38) | THEORETICAL POSITION CORRESPONDING TO L46 |
| Cb | — |

FIG. 31

TRANSPORT AMOUNT CORRECTING METHOD, RECORDING APPARATUS, AND STORAGE MEDIUM HAVING PROGRAM STORED THEREON

CROSS-REFERENCE TO RELATED APPLICATION

The present application claims priority upon Japanese Patent Application No. 2006-229453 filed on Aug. 25, 2006, which is herein incorporated by reference.

BACKGROUND

1. Technical Field

The present invention relates to transport amount correcting methods, recording apparatuses, and storage media having a program stored thereon.

2. Related Art

Inkjet printers are known as recording apparatuses in which a medium (such as paper or cloth for example) is transported in a transport direction and recording is carried out on the medium with a head. When a transport error occurs while transporting the medium in a recording apparatus such as this, the head cannot record on a correct position on the medium. In particular, with inkjet printers, when ink droplets do not land in the correct position on the medium, there is a risk that white streaks or black streaks will occur in the printed image and picture quality will deteriorate.

Accordingly, methods of correcting transport amounts of the medium are proposed. For example, JP-A-5-96796 and JP-A-2003-11345 propose that a test pattern is printed, then the test pattern is read and correction values are calculated based on the reading result such that when an image is to be recorded, the transport amounts are corrected based on the calculated values.

In this regard, in correcting the transport amount using the position of the medium, it is necessary to store correction values corresponding to each position of the medium. However, due to memory capacity restrictions, there are cases where correction values corresponding to factors such as all sizes of media cannot be stored. Highly accurate transport could be achieved if it were possible to correct the transport amounts using the correction values of other media stored in the memory in the case where transport is to be carried out for a medium for which correction values are not stored in the memory.

SUMMARY

The present invention has been devised in light of these circumstances and it is an advantage therein to provide an apparatus capable of carrying out transport amount corrections based on correction values stored for another medium even in a case where the medium to be transported is of a size different from that of the medium for which correction values are stored.

In order to achieve the above-described advantage, a primary aspect of the invention is directed to a transport amount correcting method, comprising:

(A) storing in a memory, in regard to a medium of a predetermined size, correction values associated with relative positions of the medium and a head; and (B) when carrying out recording on the medium of the predetermined size, transporting the medium while correcting a target transport amount using a correction value associated with a relative position of the medium and the head, and when carrying out recording on a medium smaller than the predetermined size, transporting the medium while correcting the target transport amount by not using a portion of the correction values, the portion of the correction values being a portion of the correction values among the correction values used when the medium of the predetermined size is being transported by both an upstream side roller and a downstream side roller.

Other features of the invention will become clear through the accompanying drawings and the following description.

BRIEF DESCRIPTION OF THE DRAWINGS

FIG. 19 is an explanatory diagram of calculated line positions.

FIG. 25 is an explanatory diagram of a table (4×6-size) being stored in the memory 63.

FIG. 28 shows an L-size table generated based on a 4×6-size table.

FIG. 31 shows a high vision-size table generated based on a 4×6-size table.

DESCRIPTION OF EMBODIMENTS

Figure 1:
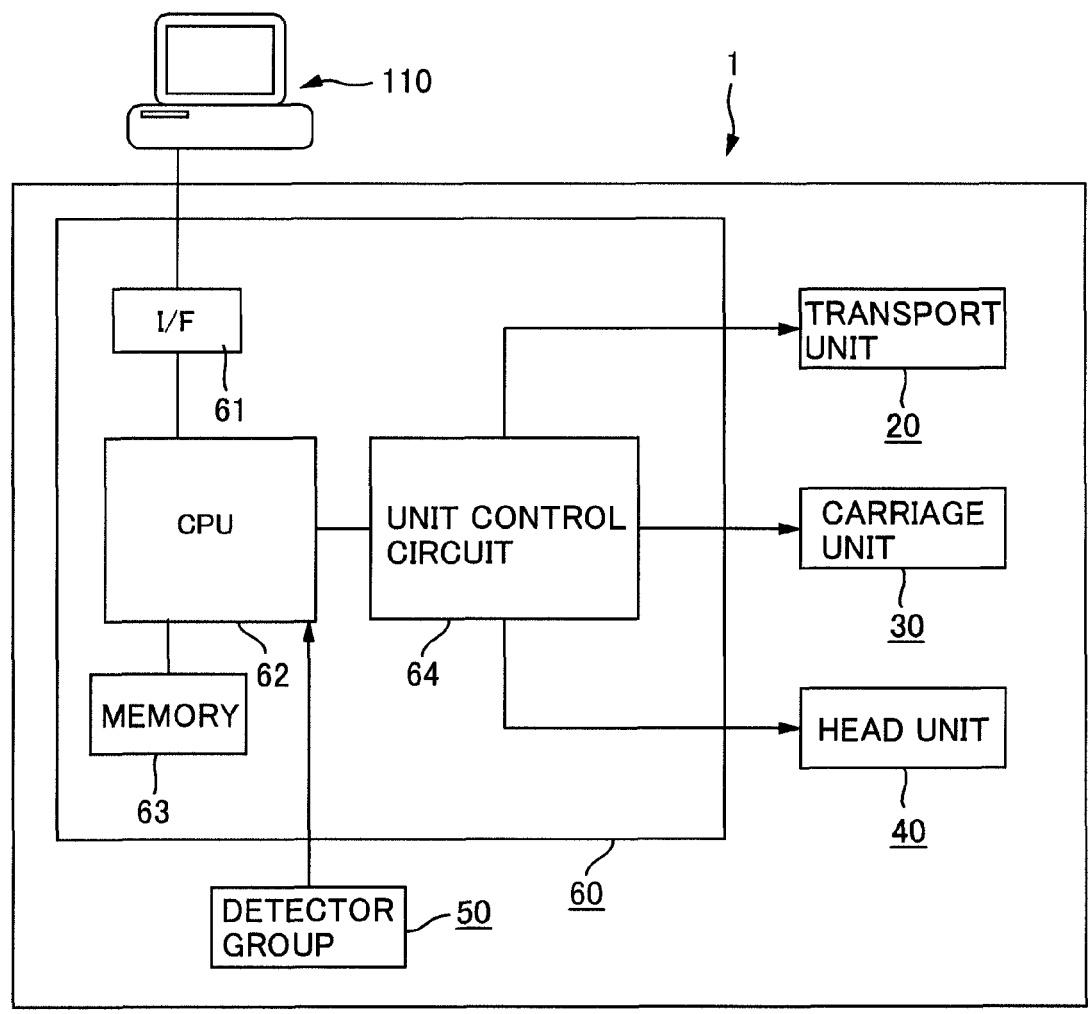
FIG. 1 is a block diagram of an overall configuration of a printer 1.

At least the following matters will be made clear by the explanation in the present specification and the description of the accompanying drawings.

A transport amount correcting method, including:
(A) storing in a memory, in regard to a medium of a predetermined size, correction values associated with relative positions of the medium and a head; and
(B) when carrying out recording on the medium of the predetermined size, transporting the medium while correcting a target transport amount using a correction value associated with a relative position of the medium and the head, and
when carrying out recording on a medium smaller than the predetermined size, transporting the medium while correcting the target transport amount by not using a portion of the correction values, the portion of the correction values being a portion of the correction values among the correction values used when the medium of the predetermined size is being transported by both an upstream side roller and a downstream side roller.

By doing this, transport amount corrections can be carried out based on correction values stored for another medium even in a case where the medium to be transported is of a size different from that of the medium for which correction values are stored.

Furthermore, it is preferable that in carrying out recording on a medium smaller than the predetermined size, the medium is transported while correction of the target transport amount is carried out such that among correction values used when transport is being performed by both the upstream side roller and the downstream side roller, correction values associated with the relative positions when a downstream side portion of the medium is below the head are not used.

Furthermore, it is preferable that the medium is transported while correction of the target transport amount is carried out such that among the correction values associated with the relative positions when a downstream side portion of the medium is below the head, a plurality of correction values, corresponding to the relative positions, that are consecutive are not used.

Furthermore, it is preferable that the portion of the correction values not used is decided in advance from a relationship between a medium for which transport is being attempted and a medium of the predetermined size stored in the memory.

Furthermore, it is preferable that when a type of medium for which transport is being attempted is different from a type of medium of the predetermined size stored in the memory, a predetermined fixed number is added to the correction value stored in the memory and the medium is transported while the target transport amount is corrected based on the correction value after adding.

Furthermore, it is preferable that when carrying out recording on a medium larger than the predetermined size, the medium is transported while correcting the target transport amount by repetitively using the portion of the correction values.

Furthermore, it is preferable that with respect to each of the correction values, a range of the relative position to which the correction value should be applied is associated with the correction value, and when the range of the correction value corresponding to the relative position before transport is exceeded when perform transporting using the target transport amount, the target transport amount is corrected based on the correction value corresponding to the relative position before transport and the correction value corresponding to the relative position after transport.

Furthermore, it is preferable that with respect to each of the correction values, a range of the relative position to which the correction value should be applied is associated with the correction value, and the target transport amount is corrected by weighting the correction values in accordance with a ratio between a range in which the relative position varies when transporting using the target transport amount and the range of the relative position to which the correction value is to be applied.

Furthermore, it is preferable that the upstream side roller is a transport roller that transports the medium in a transport direction by rotating, each of the correction values is determined based on transport error when the medium has been transported by causing the transport roller to perform a single rotation, and a range of the relative position to which the correction value is to be applied corresponds to a transport amount of when the medium has been transported by causing the transport roller to rotate by a rotation amount of less than one rotation.

By doing this, transport amount corrections can be carried out based on correction values stored for another medium even in a case where the medium to be transported is of a size different from that of the medium for which correction values are stored.

A recording apparatus, including:
(A) a head for carrying out recording on a medium;
(B) a transport mechanism including a roller at an upstream side from the head and a roller at a downstream side from the head, the transport mechanism transporting the medium in a transport direction in response to a target transport amount that is targeted;
(C) a memory that stores, in regard to the medium of a predetermined size, a plurality of correction values associated with relative positions of the medium and the head; and
(D) a controller that, when carrying out recording on the medium of the predetermined size, causes the transport mechanism to transport the medium while correcting the target transport amount using a correction value associated with a relative position of the medium and the head, and
when carrying out recording on a medium smaller than the predetermined size, causes the transport mechanism to transport the medium while correcting the target transport amount such that a portion of the correction values among the correction values used when the medium of the predetermined size is being transported by both the upstream side roller and the downstream side roller is not used.

By doing this, transport amount corrections can be carried out based on correction values stored for another medium even in a case where the medium to be transported is of a size different from that of the medium for which correction values are stored.

A storage medium having a program stored thereon, including:
(A) code for storing in a memory, in regard to a medium of a predetermined size, correction values associated with relative positions of the medium and a head; and
(B) code for, when carrying out recording on the medium of the predetermined size, transporting the medium while correcting a target transport amount using a correction value associated with a relative position of the medium and the head, and
when carrying out recording on a medium smaller than the predetermined size, transporting the medium while correcting the target transport amount by not using a portion of the correction values, the portion of the correction values being a portion of the correction values among the correction values used when the medium of the predetermined size is being transported by both an upstream side roller and a downstream side roller.

By doing this, transport amount corrections can be carried out based on correction values stored for another medium even in a case where the medium to be transported is of a size different from that of the medium for which correction values are stored.

Configuration of the Printer
Regarding the Configuration of the Inkjet Printer

Figure 2A:
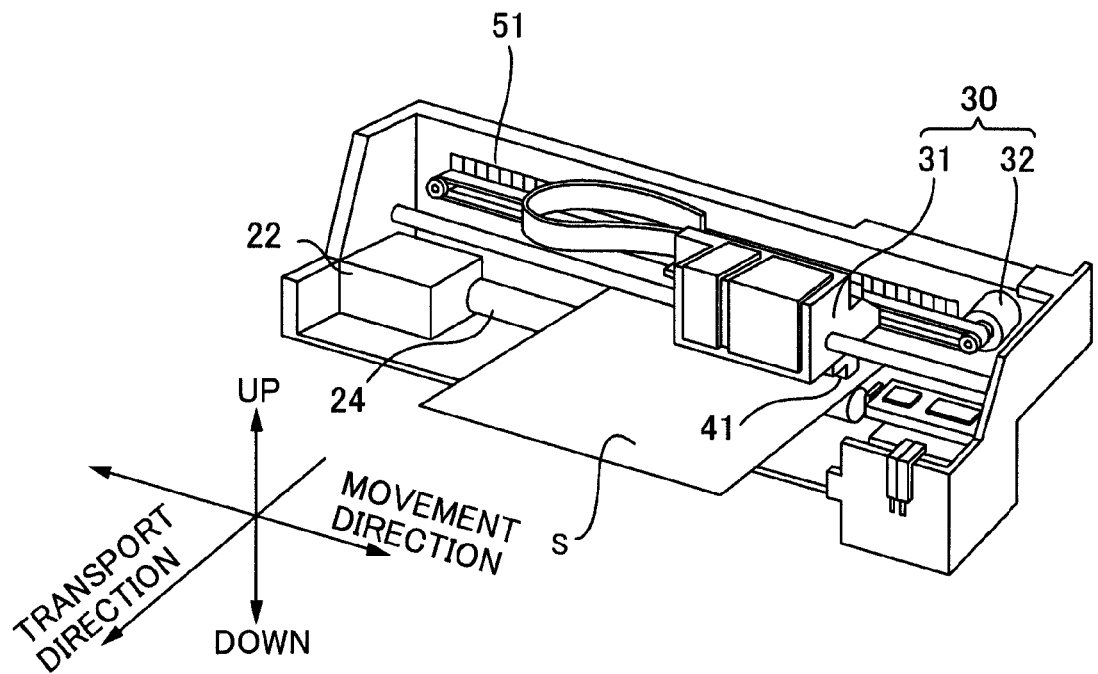
FIG. 2A is a schematic view of the overall configuration of a printer 1.
Figure 2B:
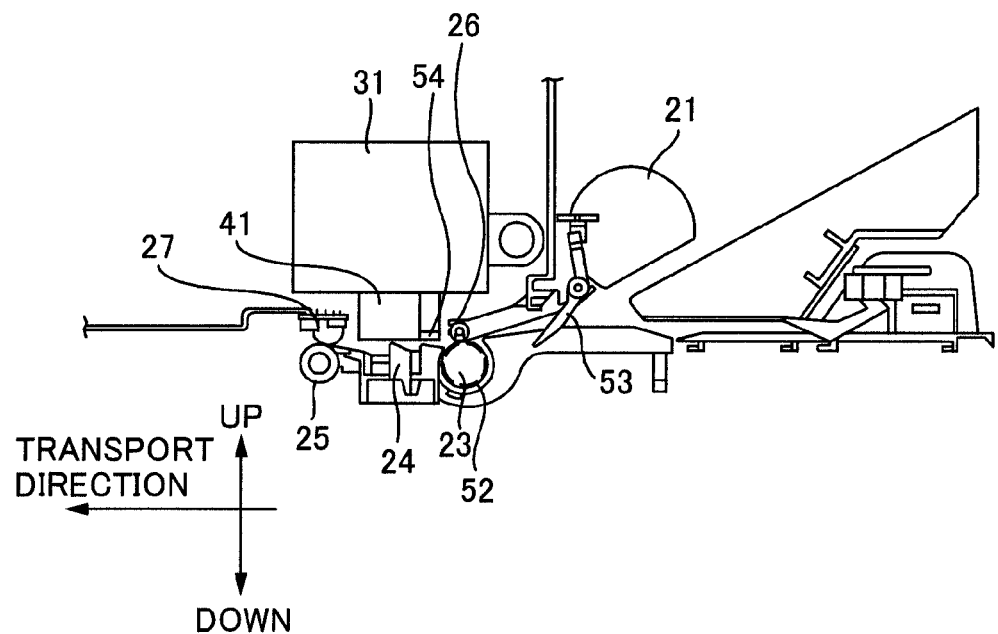
FIG. 2B is a transverse cross-section of the overall configuration of the printer 1.

FIG. 1 is a block diagram of an overall configuration of a printer 1. FIG. 2A is a schematic view of the overall configuration of the printer 1. FIG. 2B is a cross-sectional view of the overall configuration of the printer 1. Hereinafter, the basic configuration of the printer is described.

The printer 1 has a transport unit 20, a carriage unit 30, a head unit 40, a detector group 50, and a controller 60. The printer 1, which receives print data from a computer 110, which is an external device, controls the various units (the transport unit 20, the carriage unit 30, and the head unit 40) using the controller 60. The controller 60 controls the units based on the print data received from the computer 110, to form an image on paper. The detector group 50 monitors the conditions within the printer 1, and outputs the detection results to the controller 60. The controller 60 controls the units based on the detection results output from the detector group 50.

The transport unit 20 is for transporting a medium (for example, such as paper S) in a predetermined direction (hereinafter referred to as a "transport direction"). The transport unit 20 has a paper-feed roller 21, a transport motor 22 (hereinafter also referred to as PF motor), a transport roller 23, a platen 24, and a discharge roller 25. The paper feed roller 21 is a roller for feeding paper that has been inserted into a paper insert opening into the printer. The transport roller 23 is a roller for transporting the paper S that has been supplied by the paper supply roller 21 up to a printable region, and is driven by the transport motor 22. The platen 24 supports the paper S during printing. The discharge roller 25 is a roller for discharging the paper S to outside the printer, and is provided on the transport direction downstream side of the printable region. The discharge roller 25 is rotated in synchronization with the transport roller 23.

It should be noted that when the transport roller 23 transports the paper S, the paper S is sandwiched between the transport roller 23 and a driven roller 26. In this way, the posture of the paper S is kept stable. On the other hand, when the discharge roller 25 transports the paper S, the paper S is sandwiched between the discharge roller 25 and a driven roller 27. The discharge roller 25 is provided on a downstream side from the printable region in the transport direction and therefore the driven roller 27 is configured so that its contact surface with the paper S is small (see FIG. 4). For this reason, when the lower end of the paper S passes the transport roller 23 and the paper S becomes transported by the discharge roller 25 only, the posture of the paper S tends to become unstable, which also tends to make the transport characteristics fluctuate.

The carriage unit 30 is for making the head move (also referred to as "scan") in a predetermined direction (hereinafter, referred to as the "movement direction"). The carriage unit 30 has a carriage 31 and a carriage motor 32 (also referred to as "CR motor"). The carriage 31 can move in a reciprocating manner along the movement direction, and is driven by the carriage motor 32. Furthermore, the carriage 31 detachably retains an ink cartridge containing ink.

The head unit 40 is for ejecting ink onto paper. The head unit 40 is provided with a head 41 including a plurality of nozzles. The head 41 is provided to the carriage 31 so that when the carriage 31 moves in the movement direction, the head 41 also moves in the movement direction. Then, dot lines (raster lines) are formed on the paper in the movement direction as a result of the head 41 intermittently ejecting ink while moving in the movement direction.

The detector group 50 includes a linear encoder 51, a rotary encoder 52, a paper detection sensor 53, and an optical sensor 54, for example. The linear encoder 51 is for detecting the position of the carriage 31 in the movement direction. The rotary encoder 52 is for detecting the amount of rotation of the transport roller 23. The paper detection sensor 53 detects the position of the front end of the paper that is being fed. The optical sensor 54 detects whether or not the paper is present by a light-emitting section and a light-receiving section provided in the carriage 31. The optical sensor 54 can also detect the width of the paper by detecting the position of the end portions of the paper while being moved with the carriage 31.

Depending on the circumstances, the optical sensor 54 can also detect the front end of the paper (the end portion on the transport direction downstream side; also called the upper end) and the rear end of the paper (the end portion on the transport direction upstream side; also called the lower end).

The controller 60 is a control unit (controller) for controlling the printer. The controller 60 has an interface section 61, a CPU 62, a memory 63, and a unit control circuit 64. The interface section 61 exchanges data between the computer 110, which is an external device, and the printer 1. The CPU 62 is a computer processing device for carrying out overall control of the printer. The memory 63 is for reserving a working region and a region for storing the programs for the CPU 62, for instance, and has a memory means such as a RAM or an EEPROM. The CPU 62 controls each unit via the unit control circuit 64 according to a program stored in the memory 63.

Regarding the Nozzles

Figure 3:
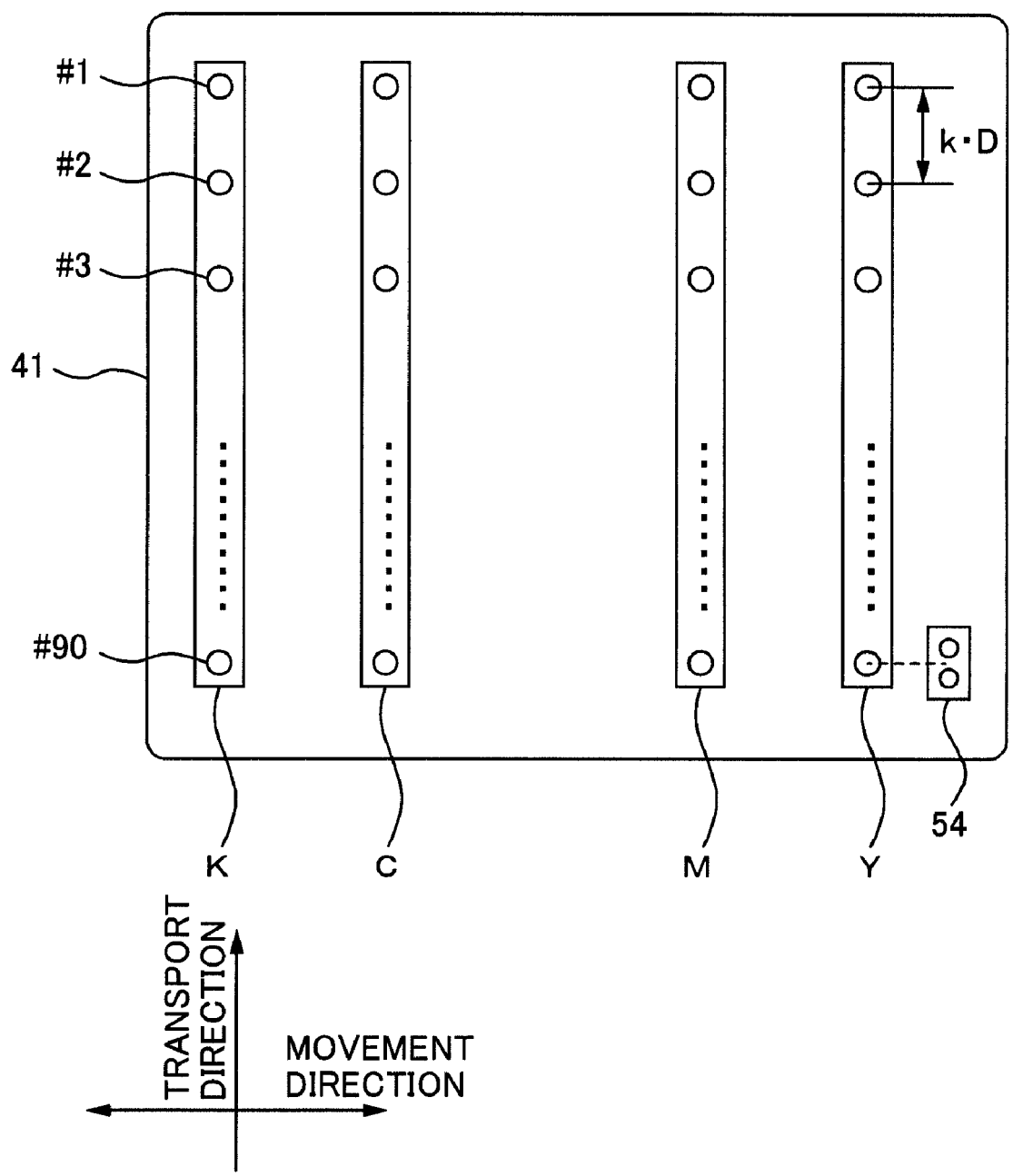
FIG. 3 is an explanatory diagram showing an arrangement of nozzles.

FIG. 3 is an explanatory diagram showing the arrangement of the nozzles in the lower surface of the head 41. A black ink nozzle group K, a cyan ink nozzle group C, a magenta ink nozzle group M, and a yellow ink nozzle group Y are formed in the lower surface of the head 41. Each nozzle group is provided with 90 nozzles that are ejection openings for ejecting inks of various colors.

The plurality of nozzles of the nozzle groups are arranged in rows at a constant spacing (nozzle pitch: k·D) in the transport direction. Here D is the minimum dot pitch in the transport direction (that is, the spacing at the maximum resolution of dots formed on the paper S). Also, k is an integer of 1 or more. For example, if the nozzle pitch is 90 dpi (1/90 inch) and the dot pitch in the transport direction is 720 dpi (1/720), then k=8.

The nozzles of each of the nozzle groups are assigned a number (#1 through #90) that becomes smaller for nozzles further downstream. That is, the nozzle #1 is positioned more downstream in the transport direction than the nozzle #90. Also, the optical sensor 54 is provided substantially to the same position as the nozzle #90, which is on the side furthest upstream, as regards the position in the paper transport direction.

Each nozzle is provided with an ink chamber (not shown) and a piezo element. Driving the piezo element causes the ink chamber to expand and contract, thereby ejecting an ink droplet from the nozzle.

Transport Error

Regarding Paper Transport

Figure 4:
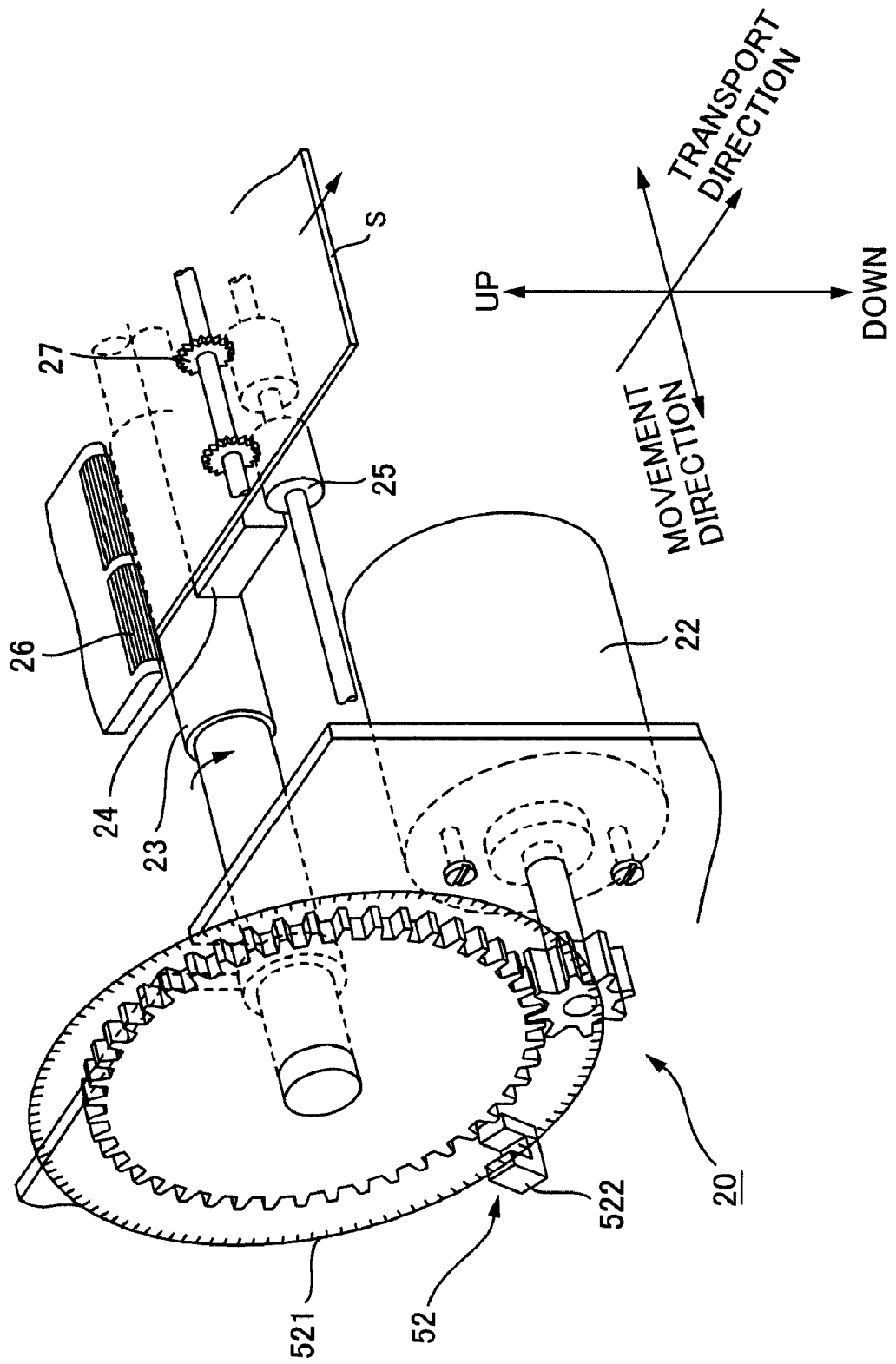
FIG. 4 is an explanatory diagram of a configuration of a transport unit 20.

FIG. 4 is an explanatory diagram of a configuration of the transport unit 20.

The transport unit 20 drives the transport motor 22 by predetermined drive amounts in accordance with a transport command from the controller 60. The transport motor 22 generates a drive force in the rotation direction that corresponds to the drive amount that has been ordered. The transport motor 22 then rotates the transport roller 23 using this drive force. That is, when the transport motor 22 generates a predetermined drive amount, the transport roller 23 is rotated by a predetermined rotation amount. When the transport roller 23 is rotated by the predetermined rotation amount, the paper is transported by a predetermined transport amount.

The amount that the paper is transported is determined according to the rotation amount of the transport roller 23. Here, when the transport roller 23 rotates one time, the paper is transported one inch (that is, the circumference of the transport roller 23 is one inch). Thus, when the transport roller 23 rotates one quarter, the paper is transported ¼ inch.

Consequently, if the rotation amount of the transport roller 23 can be detected then it is also possible to detect the transport amount of the paper. Accordingly, the rotary encoder 52 is provided in order to detect the rotation amount of the transport roller 23.

The rotary encoder 52 has a scale 521 and a detection section 522. The scale 521 has numerous slits provided at a predetermined spacing. The scale 521 is provided in the transport roller 23. That is, the scale 521 rotates together with the transport roller 23 when the transport roller 23 is rotated. Then, when the transport roller 23 rotates, each slit on the scale 521 successively passes through the detection section 522. The detection section 522 is provided in opposition to the scale 521, and is fastened on the main printer unit side. The rotary encoder 52 outputs a pulse signal each time a slit provided in the scale 521 passes through the detection section 522. Since the slits provided in the scale 521 successively pass through the detection section 522 according to the rotation amount of the transport roller 23, the rotation amount of the transport roller 23 is detected based on the output of the rotary encoder 52.

Then, when the paper is to be transported by a transport amount of one inch for example, the controller 60 drives the transport motor 22 until the rotary encoder 52 detects that the transport roller 23 has rotated one time. In this manner, the controller 60 drives the transport motor 22 until a transport amount corresponding to a targeted transport amount (target transport amount) is detected by the rotary encoder 52 such that the paper is transported by the target transport amount.

Regarding Transport Error

Incidentally, the rotary encoder 52 directly detects the rotation amount of the transport roller 23, and strictly speaking does not detect the transport amount of the paper S. For this reason, when the rotation amount of the transport roller 23 and the transport amount of the paper S do not match, the rotary encoder 52 cannot accurately detect the transport amount of the paper S, resulting in a transport error (detection error). There are two types of transport error, DC component transport error and AC component transport error.

DC component transport error refers to a predetermined amount of transport error produced when the transport roller has rotated one time. The DC component transport error would seem to be caused by the circumference of the transport roller 23 being different in each individual printer due to deviation in production and the like. In other words, the DC component transport error is transport error that occurs because the circumference of the transport roller 23 in design and the actual circumference of the transport roller 23 are different. The DC component transport error is constant regardless of the commencement position when the transport roller 23 rotates one time. However, due to the effect of paper friction and the like, the actual DC component transport error is a value that varies in response to a total transport amount of the paper (discussed later). In other words, the actual DC component transport error is a value that varies in response to the relative position relationship between the paper S and the transport roller 23 (or the paper S and the head 41).

AC component transport error refers to transport error corresponding to a location on a circumferential surface of the transport roller that is used when transporting. AC component transport error varies in amount in response to the location on the circumferential surface of the transport roller that is used when transporting. That is, the AC component transport error is an amount that varies in response to the rotation position and transport amount of the transport roller when transport commences.

Figure 5:
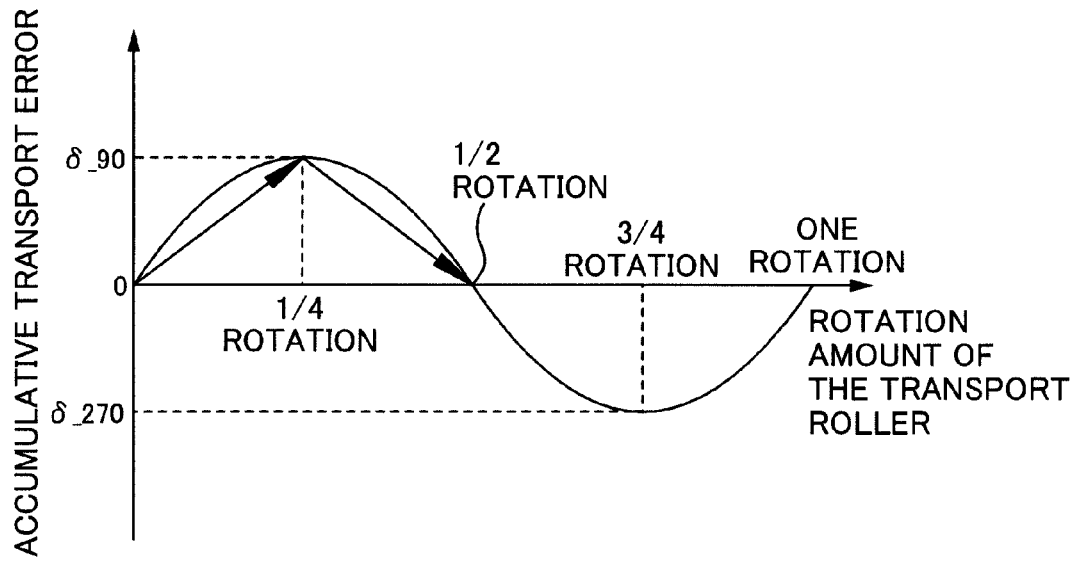
FIG. 5 is a graph for describing AC component transport error.

FIG. 5 is a graph for describing AC component transport error. The horizontal axis indicates the rotation amount of the transport roller 23 from a reference rotation position. The vertical axis indicates transport error. When the graph is differentiated, the transport error produced when the transport roller rotates at the rotation position is deduced. Here, accumulative transport error at the reference position is set to zero and the DC component transport error is also set to zero.

When the transport roller 23 performs a ¼ rotation from the reference position, a transport error of $\delta\_90$ is produced, and the paper is transported ¼ inch+$\delta\_90$. However, when the transport roller 23 performs a further ¼ rotation, a transport error of $-\delta\_90$ is produced, and the paper is transported ¼ inch−$\delta\_90$.

The following three causes for example are conceivable as causes of AC component transport error.

First, influence due to the shape of the transport roller is conceivable. For example, when the transport roller is elliptical or egg shaped, the distance to the rotational center varies in response to the location on the circumferential surface of the transport roller. And when the medium is transported at an area where the distance to the rotational center is long, the transport amount increases with respect to the rotation amount of the transport roller. On the other hand, when the medium is transported at an area where the distance to the rotational center is short, the transport amount decreases with respect to the rotation amount of the transport roller.

Secondly, the eccentricity of the rotational axis of the transport roller is conceivable. In this case too, the length to the rotational center varies in response to the location on the circumferential surface of the transport roller. For this reason, even if the rotation amount of the transport roller is the same, the transport amount varies in response to the location on the circumferential surface of the transport roller.

Thirdly, inconsistency between the rotational axis of the transport roller and the center of the scale 521 of the rotary encoder 52 is conceivable. In this case, the scale 521 rotates eccentrically. As a result, the rotation amount of the transport roller 23 varies with respect to the detected pulse signals in response to the location of the scale 521 detected by the detection section 522. For example, when the detected location of the scale 521 is apart from the rotational axis of the transport roller 23, the rotation amount of the transport roller 23 becomes smaller with respect to the detected pulse signals, and therefore the transport amount becomes smaller. On the other hand, when the detected location of the scale 521 is close to the rotational axis of the transport roller 23, the rotation amount of the transport roller 23 becomes larger with respect to the detected pulse signals, and therefore the transport amount becomes larger.

As a result of these causes, the AC component transport error forms substantially a sine curve as shown in FIG. 5.

Transport Error Corrected

Figure 6:
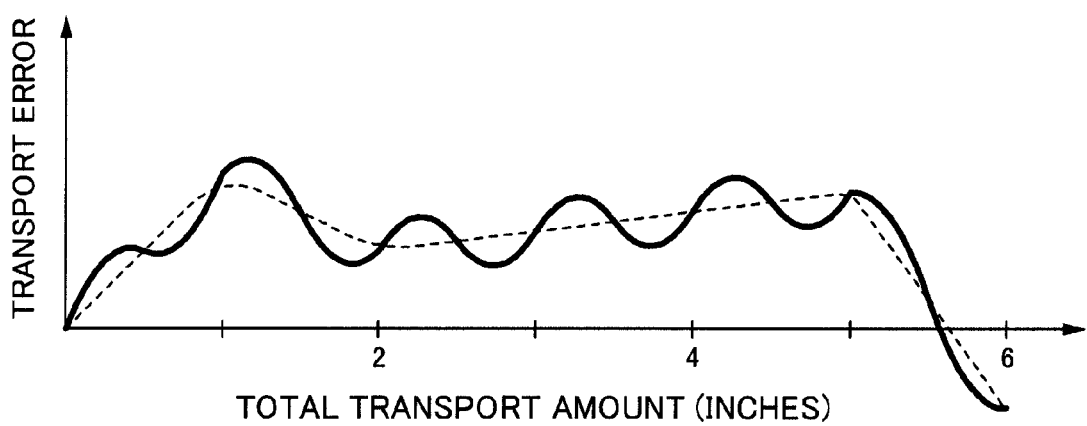
FIG. 6 is a graph (schematic diagram) of transport error produced when transporting a paper.

FIG. 6 is a graph (conceptual diagram) of transport error produced when transporting a paper of a size 101.6 mm×152.4 mm (4×6 inches). The horizontal axis in the graph indicates a total transport amount of the paper. The vertical axis in the graph indicates transport error. The dotted line in the diagram is a graph of the DC component transport error. The AC component transport error is obtainable by subtracting the dotted line values (DC component transport error) in the drawing from the solid line values (total transport error) in the drawing. Regardless of the total transport amount of the paper, the AC component transport error forms substantially a sine curve. On the other hand, due to the effect of paper friction and the like, the DC component transport error indicated by the dotted line is a value that varies in response to the total transport amount of the paper.

As has been described, AC component transport error varies in response to the location on the circumferential surface of the transport roller 23. For this reason, even when transporting papers that are the same, the AC component transport error will vary if there are different rotation positions on the transport roller 23 at the commencement of transport, and therefore the total transport error (transport error indicated by a solid line on the graph) will vary. In contrast to this, unlike AC component transport error, DC component transport error has no relation to the location on the circumferential surface of the transport roller, and therefore even if the rotation position of the transport roller 23 varies at the commencement of transport, the transport error (DC component transport error) produced when the transport roller rotates one time is the same.

Furthermore, when attempting to correct AC component transport error, it is necessary for the controller 60 to detect the rotation position of the transport roller 23. However, to detect the rotation position of the transport roller 23 it is necessary to further prepare an origin sensor for the rotary encoder 52, which results in increased costs.

Consequently, in the transport amount corrections shown below in the reference example, DC component transport error is corrected.

On the other hand, DC component transport error is a value that varies (see the dotted line in FIG. 6) in response to the total transport amount of the paper (in other words, the relative position relationship between the paper S and the transport roller 23). For this reason, if a greater number of correction values can be prepared corresponding to transport direction positions, fine corrections of transport error can be achieved. Consequently, in the reference example, correction values for correcting DC component transport error are prepared for each ¼ inch range rather than for each one inch range corresponding to a single rotation of the transport roller 23.

Outline Description

Figure 7:
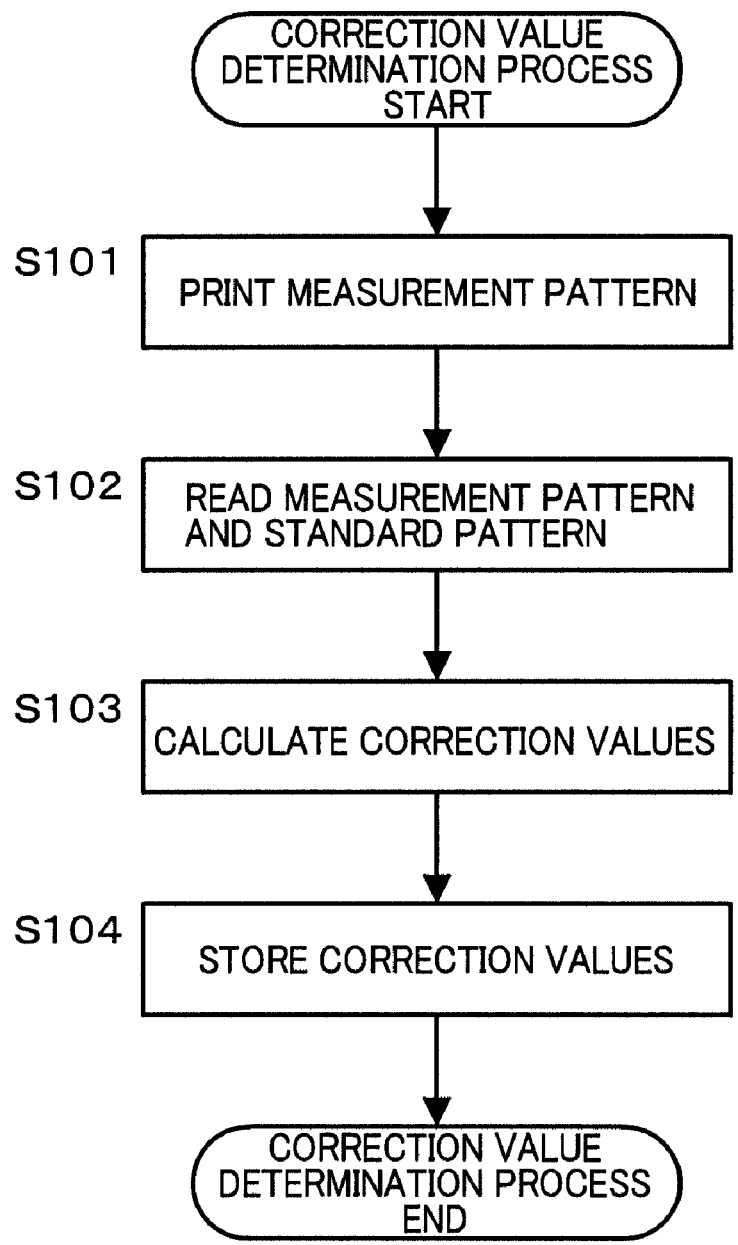
FIG. 7 is a flowchart showing up to determining the correction values for correcting transport amounts.
Figure 8A:
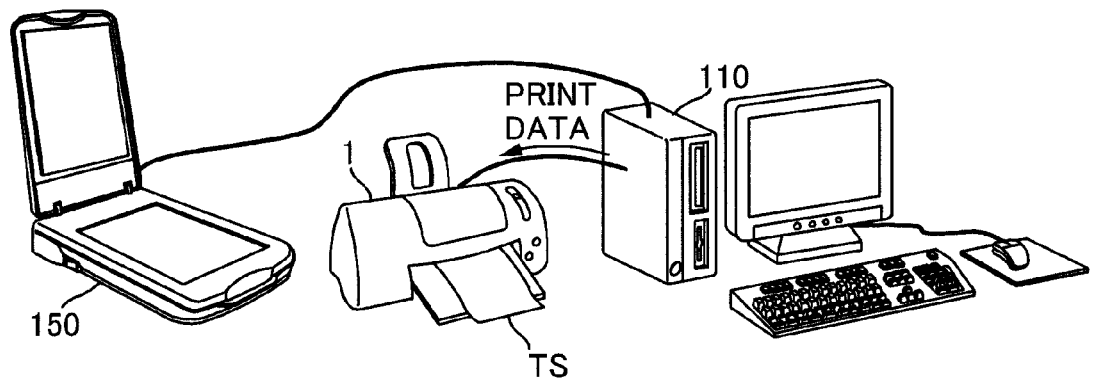
FIGS. 8A to 8C are explanatory diagrams of conditions up to determining correction values.
Figure 8B:
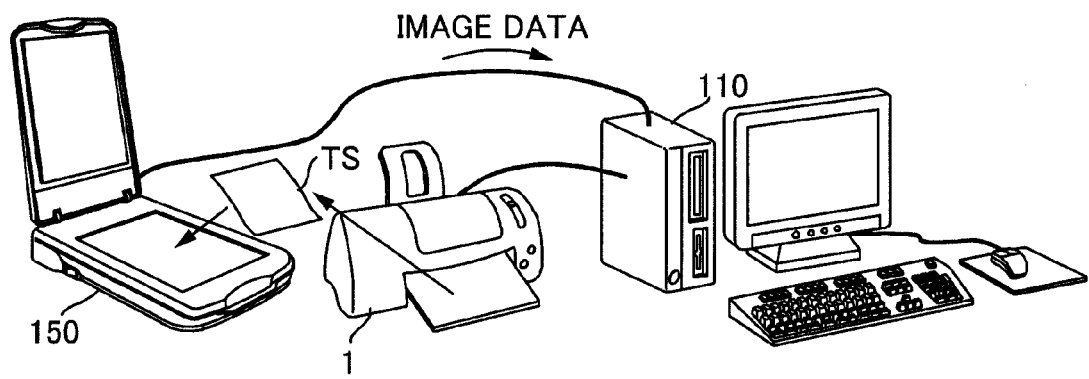
Figure 8C:
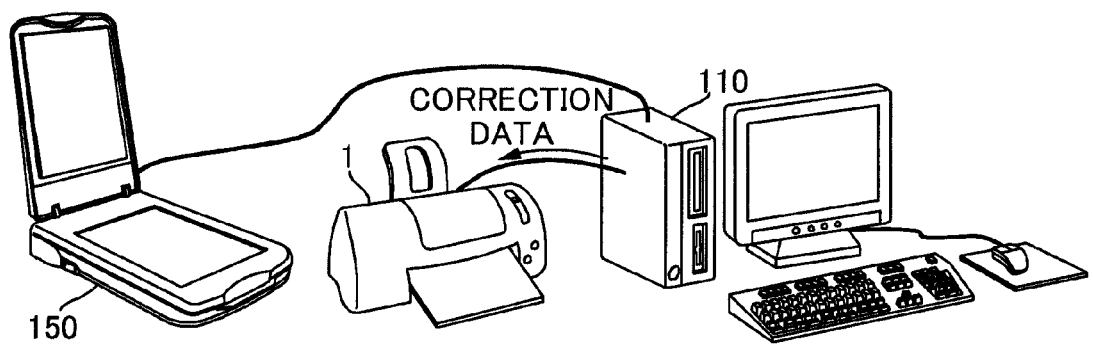

FIG. 7 is a flowchart showing up to determining the correction values for correcting transport amounts. FIGS. 8A to 8C are explanatory diagrams of conditions up to determining correction values. These processes are performed in an inspection process at a printer manufacturing factory. Prior to this process, an inspector connects a printer 1 that is fully assembled to a computer 110 at the factory. The computer 110 at the factory is connected to a scanner 150 and is preinstalled with a printer driver, a scanner driver, and a program for obtaining correction values.

First, the printer driver sends print data to the printer 1 and the printer 1 prints (S101, FIG. 8A) a measurement pattern on a test sheet TS. Next, the inspector sets the test sheet TS in the scanner 150 and the scanner driver causes the measurement pattern to be read with the scanner 150 such that image data is obtained (S102, FIG. 8B). It should be noted that a standard sheet is set in the scanner 150 along with the test sheet TS, and a standard pattern drawn on the standard sheet is also read together.

Then, the program for obtaining correction values analyzes the image data that has been obtained and calculates correction values (S103). Then the program for obtaining correction values sends the correction data to the printer 1 and the correction values are stored (FIG. 8C) in a memory 63 of the printer 1. The correction values stored in the printer reflect the transport characteristics of each individual printer.

It should be noted that the printer, which has stored correction values, is packaged and delivered to a user. When the user is to print an image with the printer, the printer transports the paper based on the correction values and prints the image onto the paper.

Measurement Pattern Printing (S101)

First, description is given concerning the printing of the measurement pattern. As with ordinary printing, the printer 1 prints the measurement pattern by alternately repeating a dot forming process, in which dots are formed by ejecting ink from moving nozzles, and a transport operation in which the paper is transported in the transport direction. It should be noted that in the description hereinafter, the dot forming process is referred to as a "pass" and an n-th dot forming process is referred to as "pass n."

Figure 9:
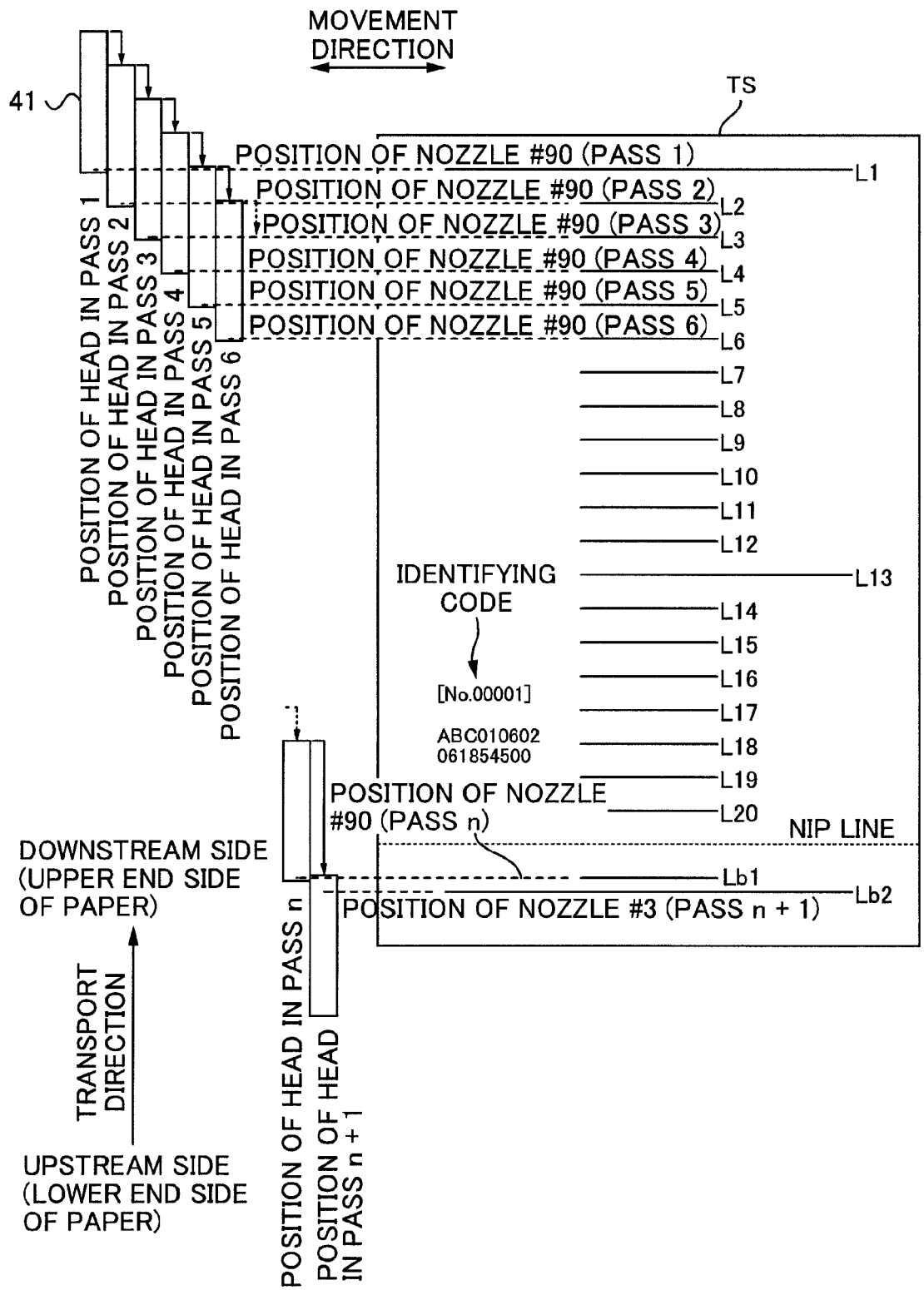
FIG. 9 is an explanatory diagram illustrating a state of printing of a measurement pattern.

FIG. 9 is an explanatory diagram illustrating a state of printing of a measurement pattern. The size of a test sheet TS on which the measurement pattern is to be printed is 101.6 mm×152.4 mm (4×6 inches).

The measurement pattern printed on the test sheet TS is shown on the right side of FIG. 9. The rectangles on the left side of FIG. 9 indicate the position (the relative position with respect to the test sheet TS) of the head 41 at each pass. To facilitate description, the head 41 is illustrated as if moving with respect to the test sheet TS, but the FIG. 9 shows the relative positional relationship of the head and the test sheet TS and in fact the test sheet TS is being transported intermittently in the transport direction.

When the test sheet TS continues to be transported, the lower end of the test sheet TS passes over the transport roller 23. The position on the test sheet TS in opposition to the most upstream nozzle #90 when the lower end of the test sheet TS passes over the transport roller 23 is shown by a dotted line in FIG. 9 as a "NIP line." That is, in passes where the head 41 is higher than the NIP line in FIG. 9, printing is carried out in a state in which the test sheet TS is sandwiched between the transport roller 23 and the driven roller 26 (also referred to as a "NIP state"). Furthermore, in passes where the head 41 is lower than the NIP line in FIG. 9, printing is carried out in a state in which the test sheet TS is not between the transport roller 23 and the driven roller 26 (which is a state in which the test sheet TS is transported by only the discharge roller 25 and the driven roller 27 and is also referred to as a "non NIP state").

The measurement pattern is constituted by an identifying code and a plurality of lines.

The identifying code is a symbol for individual identification for identifying each of the individual printers 1 respectively. The identifying code is also read together when the measurement pattern is read at S102, and is identified in the computer 110 using OCR character recognition.

Each of the lines is formed in the movement direction. More lines are formed on the upper end side of the NIP line. Lines on the upper end side from the NIP line are numbered "Li" in order from the upper end side for each i-th line. Furthermore, two lines are formed on the lower end side from the NIP line. Of the two lines on the lower end side from the NIP line, the upper side line is numbered Lb1 and the lower side line (the lowest line) is numbered Lb2. Specific lines are formed longer than other lines. For example, line L1, line L13, and line Lb2 are formed longer compared to the other lines. These lines are formed as follows.

First, after the test sheet TS is transported to a predetermined print commencement position, ink droplets are ejected from nozzle #90 only in pass 1 thereby forming the line L1. After pass 1, the controller 60 causes the transport roller 23 to perform a ¼ rotation so that the test sheet TS is transported by approximately ¼ inch. First, after transport, ink droplets are ejected from only nozzle #90 in pass 2 thereby forming the line L2. Thereafter, the same operation is repeated and the lines L1 to L20 are formed at intervals of approximately ¼ inch. In this manner, the line L1 to line L20, which are on the upper end side from the NIP line, are formed using the most upstream nozzle #90 of the nozzles #1 to nozzle #90. In this way, the most lines possible can be formed on the test sheet TS in the NIP state. It should be noted that although line L1 to line L20 are formed using only nozzle #90, nozzles other than the nozzle #90 are used when printing the identifying code in the pass in which the identifying code is printed.

After the lower end of the test sheet TS has passed the transport roller 23, ink droplets are ejected from only nozzle #90 in pass n, thereby forming the line Lb1. After pass 1, the controller 60 causes the transport roller 23 to rotate one time so that the test sheet TS is transported by approximately one inch. After transport, ink droplets are ejected from only nozzle #3 in pass n+1, thereby forming the line Lb2. Supposing nozzle #1 was used, the interval between the line Lb1 and the line Lb2 would be extremely narrow (approximately 1/90 inch), which would make measuring difficult when the interval between the line Lb1 and the line Lb2 is measured later. For this reason, here, the interval between the line Lb1 and the line Lb2 is widened by forming the line Lb2 using nozzle #3, which is on the upstream side from the nozzle #1 in the transport direction, thereby facilitating measurement.

Incidentally, when transport of the test sheet TS is carried out ideally, the interval between the lines from line L1 to line L20 should be precisely ¼ inch. However, when there is transport error, the line interval is not ¼ inch. Suppose the test sheet TS is carried more than an ideal transport amount, then the line interval widens. Conversely, if the test sheet TS is carried less than an ideal transport amount, then the line interval narrows. That is, the interval between a certain two lines reflects the transport error in the transport process between a pass in which one of the lines is formed and a pass in which the other of the lines is formed. For this reason, by measuring the interval between two lines, it is possible to measure the transport error in the transport process between a pass in which one of the lines is formed and a pass in which the other of the lines is formed.

Similarly, the interval between the line Lb1 and the line Lb2 should be precisely 3/90 inch when transport of the test sheet TS is carried out ideally (or more accurately, when the ejection of ink from the nozzle #90 and nozzle #3 is also the same). However, when there is transport error, the line interval is not 3/90 inch. For this reason, it is conceivable that the interval between the line Lb1 and the line Lb2 reflects transport error in the transport process in a non NIP state. For this reason, if the interval between the line Lb1 and the line Lb2 is measured, it is possible to measure the transport error in the transport process in a non NIP state.

Pattern Reading (S102)

Scanner Configuration

First, description is given concerning the configuration of the scanner 150 used in reading the measurement pattern.

Figure 10A:
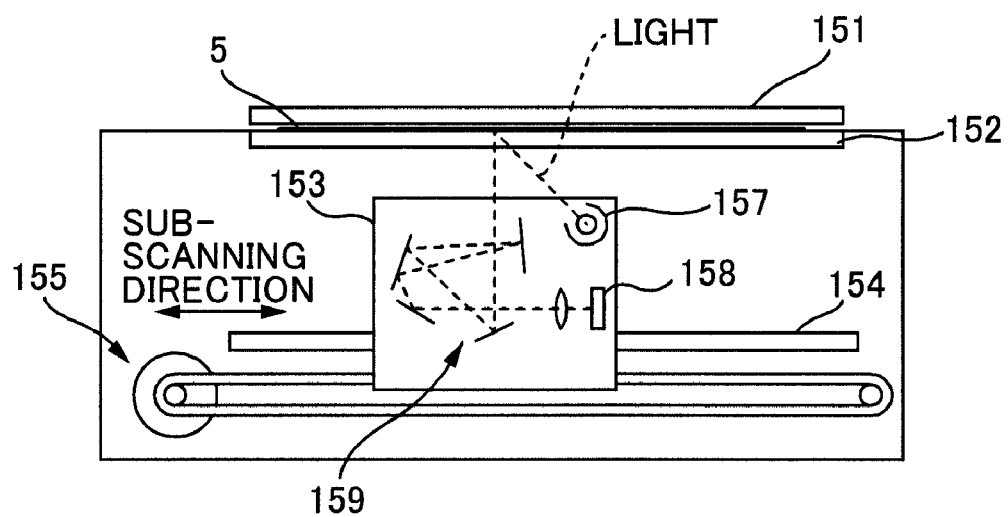
FIG. 10A is a vertical cross-sectional view of a scanner 150.
Figure 10B:
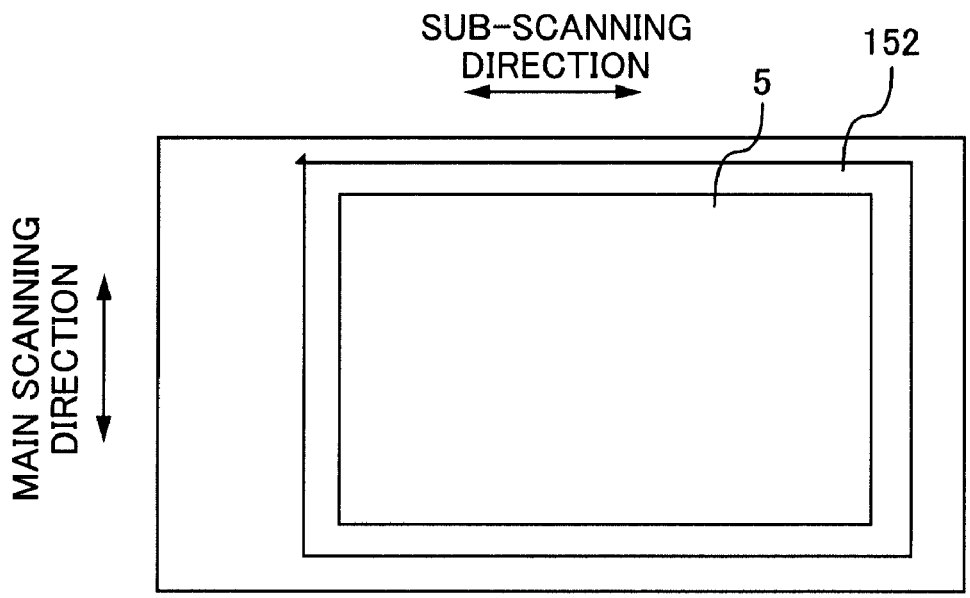
FIG. 10B is a top view of the scanner 150 with an upper cover 151 removed.

FIG. 10A is a vertical cross-sectional view of the scanner 150. FIG. 10B is a top view of the scanner 150 with an upper cover 151 removed.

The scanner 150 is provided with the upper cover 151, an original plate glass 152 on which an original 5 is placed, and a reading carriage 153 that moves in a sub-scanning direction while opposing the original 5 via the original table glass 152, a guiding member 154 that guides the reading carriage 153 in the sub-scanning direction, a moving mechanism 155 for moving the reading carriage 153, and a scanner controller (not shown) that controls each section of the scanner 150. The reading carriage 153 is provided with an exposure lamp 157 for irradiating the original 5 with light, a line sensor 158 that detects an image of a line in the main-scanning direction (direction perpendicular to the paper surface in FIG. 10A) and an optical system 159 for guiding light reflected by the original 5 to the line sensor 158. The broken line in the reading carriage 153 of FIG. 10A shows light trajectory.

When reading an image of the original 5, an operator opens the upper cover 151 and places the original 5 on the original plate glass 152, and closes the upper cover 151. Then, the scanner controller causes the reading carriage 153 to move in the sub-scanning direction while causing the exposure lamp 157 to emit light, and reads the image on the surface of the original 5 with the line sensor 158. The scanner controller transmits the image data that is read to a scanner driver of the computer 110, and the computer 110 obtains the image data of the original 5.

Positional Accuracy in Reading

As is described later, in this reference example, the scanner 150 scans the measurement pattern of the test sheet TS and the standard pattern of the standard sheet at a resolution of 720 dpi (main scanning direction)×720 dpi (sub-scanning direction). Thus, in the following description, description is given assuming image reading at a resolution of 720×720 dpi.

Figure 11:
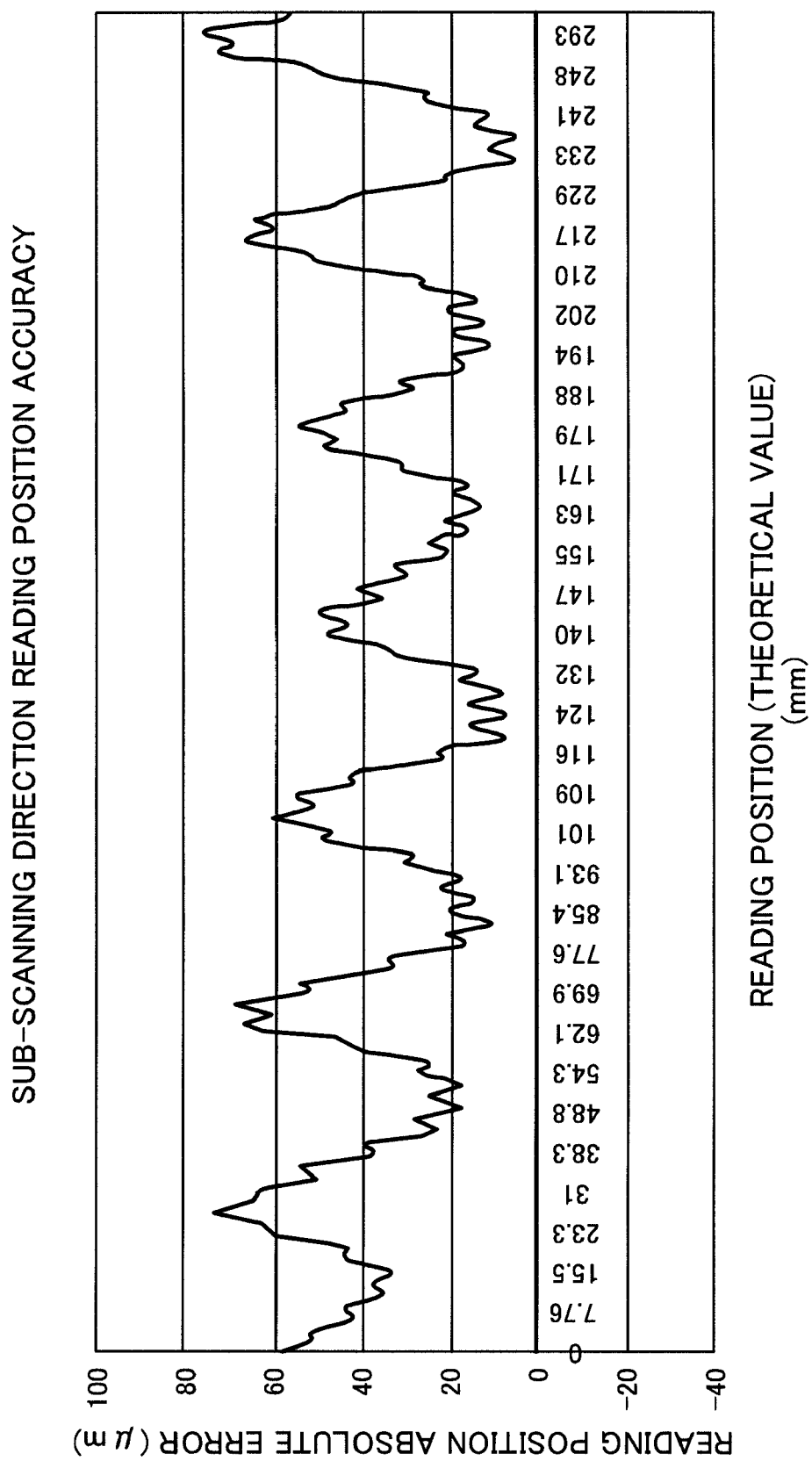
FIG. 11 is a graph of scanner reading position error.

FIG. 11 is a graph of scanner reading position error. The horizontal axis in the graph indicates reading positions (theoretical values) (that is, the horizontal axis in the graph indicates positions (theoretical values) of the reading scanning 153). The vertical axis in the graph indicates reading position error (difference between the theoretical values of reading positions and actual reading positions). For example, when the reading carriage 153 is caused to move 1 inch (=25.4 mm), an error of approximately 60 μm is produced.

Suppose that the theoretical value of the reading position and the actual reading position match, a pixel that is 720 pixels apart in the sub-scanning direction from a pixel indicating a reference position (a position where the reading position is zero) should indicate an image in a position precisely one inch from the reference position. However, when reading position error occurs as shown in the graph, the pixel that is 720 pixels apart in the sub-scanning direction from the pixel indicating a reference position indicates an image in a position that is a further 60 μm apart from the position that is one inch apart from the reference position.

Furthermore, suppose that there is zero tilt in the graph, the image should be read having a uniform interval each 1/720 inch. However, when the graph tilt is in a positive position, the image is read having an interval longer than 1/720 inch. And when the graph tilt is in a negative position, the image is read having an interval shorter than 1/720 inch.

As a result, even supposing the lines of the measurement pattern are formed having uniform intervals, the line images in the image data will not have uniform intervals in a state in which there is reading position error. In this manner, in a state in which there is reading position error, line positions cannot be accurately measured by simply reading the measurement pattern.

Consequently, in this example, when the test sheet TS is set and the measurement pattern is read by the scanner, a standard sheet is set and a standard pattern is also read.

Reading the Measurement Pattern and the Standard Pattern

Figure 12A:
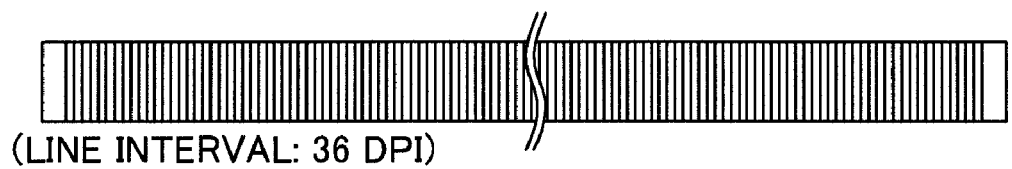
FIG. 12A is an explanatory diagram of a standard sheet SS.
Figure 12B:
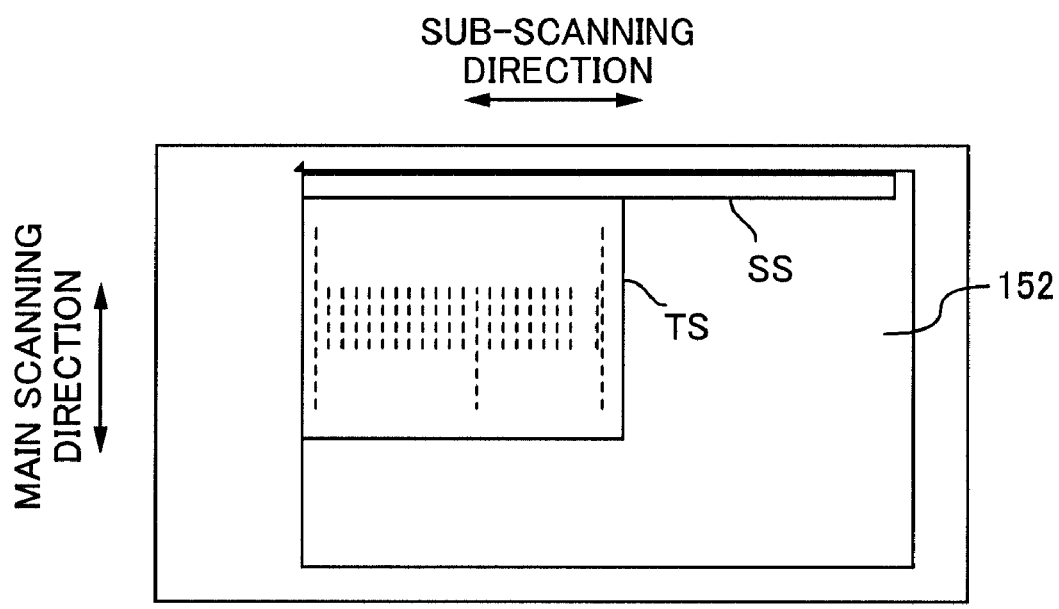
FIG. 12B is an explanatory diagram of a condition in which a test sheet TS and a standard sheet SS are set on an original plate glass 152.

FIG. 12A is an explanatory diagram for a standard sheet SS. FIG. 12B is an explanatory diagram of a condition in which a test sheet TS and a standard sheet SS are set on the original plate glass 152.

A size of the standard sheet SS is 10 mm×300 mm such that the standard sheet SS is a long narrow shape. A multitude of lines are formed as a standard pattern at intervals of 36 dpi on the standard sheet SS. Since it is used repetitively, the standard sheet SS is constituted not by paper but rather by a PET film. Furthermore, the standard pattern is formed with high precision using laser processing.

The test sheet TS and the standard sheet SS are set in a predetermined position on the original plate glass 152 using a jig not shown in the drawings. The standard sheet SS is set on the original plate glass 152 so that its long sides become parallel to the sub-scanning direction of the scanner 150, that is, so that each line of the standard sheet SS becomes parallel to the sub-scanning direction of the scanner 150. The test sheet TS is set beside the standard sheet SS. The test sheet TS is set on the original plate glass 152 so that its long sides become parallel to the sub-scanning direction of the scanner 150, that is, so that each line of the measurement pattern becomes parallel in the sub-scanning direction.

With the test sheet TS and the standard sheet SS set in this state, the scanner 150 reads the measurement pattern and the standard pattern. At this time, due to the influence of reading position error, the image of the measurement pattern in the reading result is a distorted image compared to the actual measurement pattern. Similarly, the image of the standard pattern is also a distorted image compared to the actual standard pattern.

It should be noted that the image of the measurement pattern in the reading result receives not only the influence of reading position error, but also the influence of transport error of the printer 1. On the other hand, the standard pattern is formed having a uniform interval without any relation to transport error of the printer, and therefore the image of the standard pattern receives the influence of reading position error in the scanner 150 but does not receive the influence of transport error of the printer 1.

Consequently, the program for obtaining correction values cancels the influence of reading position error in the image of the measurement pattern based on the image of the standard pattern when calculating correction values based on the image of the measurement pattern.

Calculation of Correction Values (S103)

Before describing the calculation of correction values, description is given concerning the image data obtained from the scanner 150. Image data is constituted by a plurality of pixel data. The data for each pixel indicates a tone value of the corresponding pixel. Ignoring scanner reading error, each pixel corresponds to a size of 1/720 inch×1/720 inch. An image (digital image) is constituted having pixels such as these as a smallest structural unit, and image data is data that indicates an image such as this.

Figure 13:
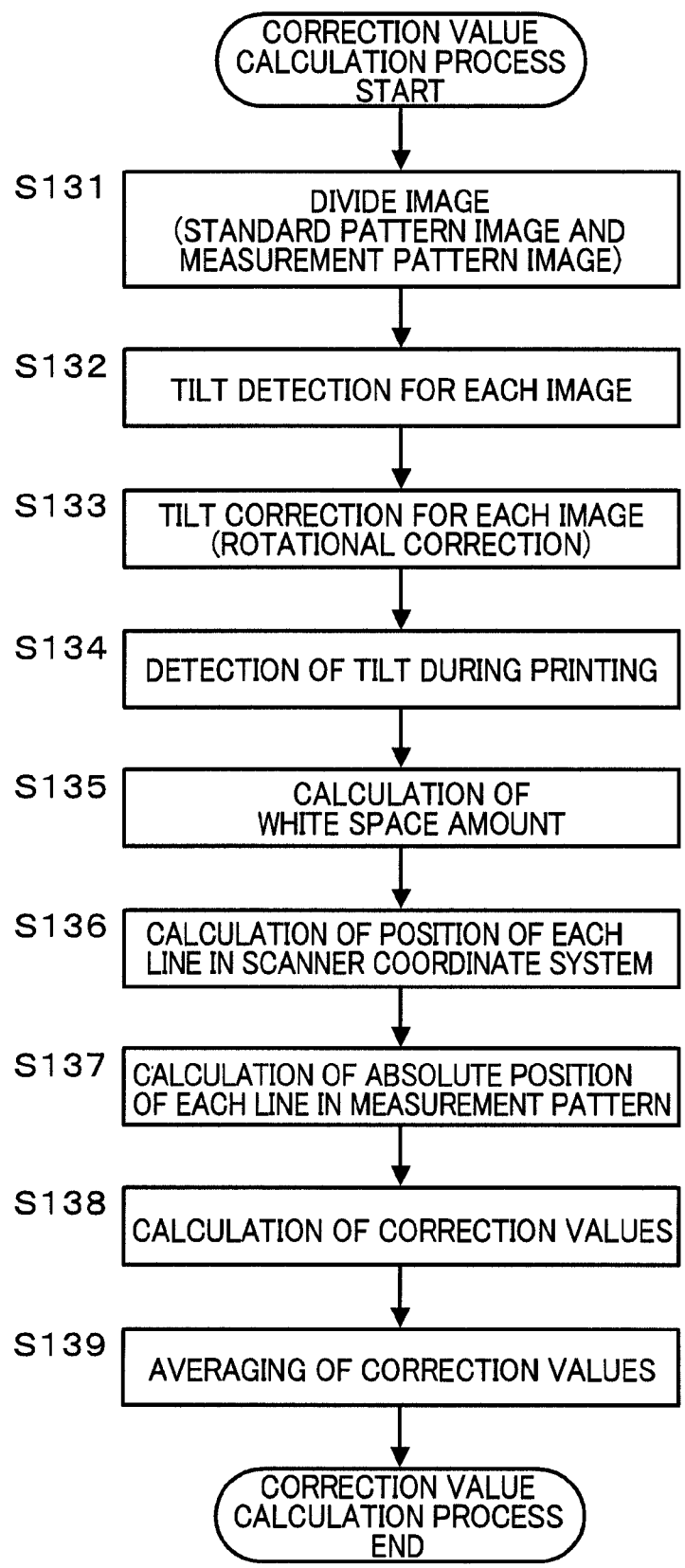
FIG. 13 is a flowchart of a correction value calculating process in S103.

FIG. 13 is a flowchart of a correction value calculating process in S103. The computer 110 executes each process in accordance with the program for obtaining correction values. That is, the program for obtaining correction values contains code for causing each process to be executed in the computer 110.

Image Division (S131)

First, the computer 110 divides (S131) the image that indicates image data obtained from the scanner 150 into two.

Figure 14:
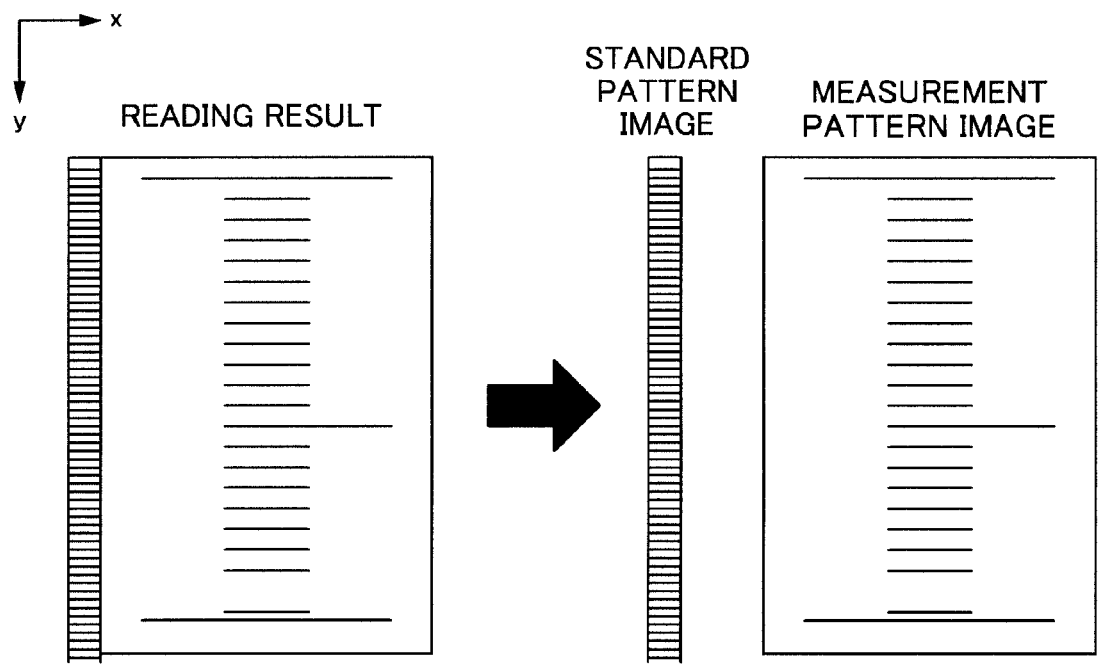
FIG. 14 is an explanatory diagram of image division (S131).

FIG. 14 is an explanatory diagram of image division (S131). On the left side of the diagram, an image is drawn indicating image data obtained from the scanner. On the right side of the diagram, a divided image is drawn. In the following description, the left-right direction (horizontal direction) in the drawing is referred to as the x direction and the up-down direction (vertical direction) in the drawing is referred to as the y direction. The lines in the image of the standard pattern are substantially parallel to the x direction and the lines in the image of the measurement pattern are substantially parallel to the y direction.

The computer 110 divides the image into two by extracting an image of a predetermined range from the image of the reading result. By dividing the image of the reading result into two, one of the images indicates an image of the standard pattern and the other of the images indicates an image of the measurement pattern. A reason for dividing in this manner is that there is a risk that the standard sheet SS and the test sheet TS are set in the scanner 150 tilted respectively, and therefore tilt correction (S133) is performed on these separately.

Image Tilt Detection (S132)

Next, the computer 110 detects the tilt of the images (S132).

Figure 15A:
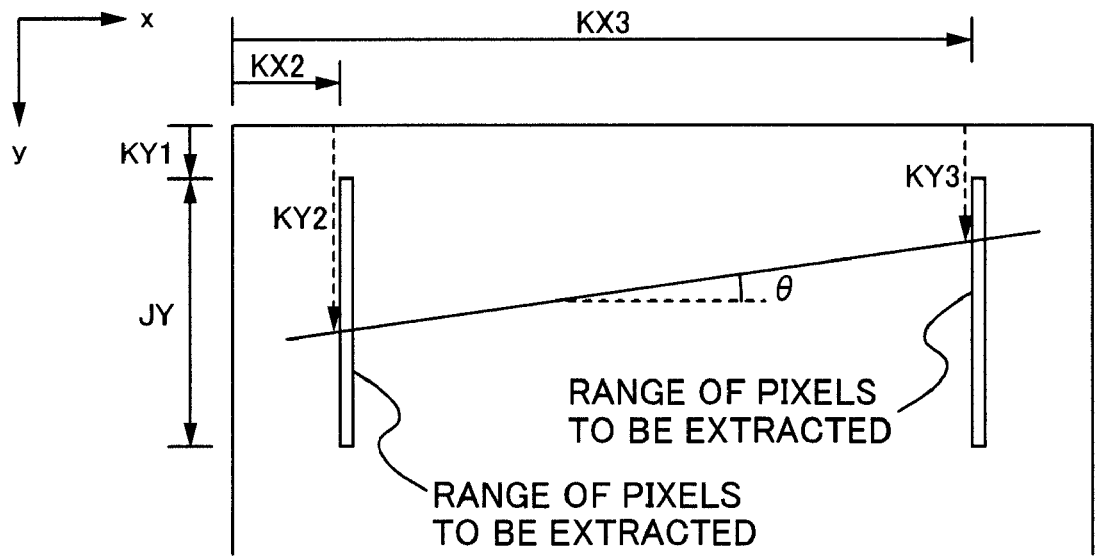
FIG. 15A is an explanatory diagram of a state in which tilt of an image of the measurement pattern is detected.

FIG. 15A is an explanatory diagram of a state in which tilt of an image of the measurement pattern is detected. The computer 110 extracts, from the image data, a JY number of pixels from the KY1-th pixel from the top of the KX2-th pixels from the left. Similarly, the computer 110 extracts, from the image data, a JY number of pixels from the KY1-th pixel from the top of the KX3-th pixels from the left. It should be noted that the parameters KX2, KX3, KY1, and JY are set so that pixels indicating the line L1 are contained in the extracted pixels.

Figure 15B:
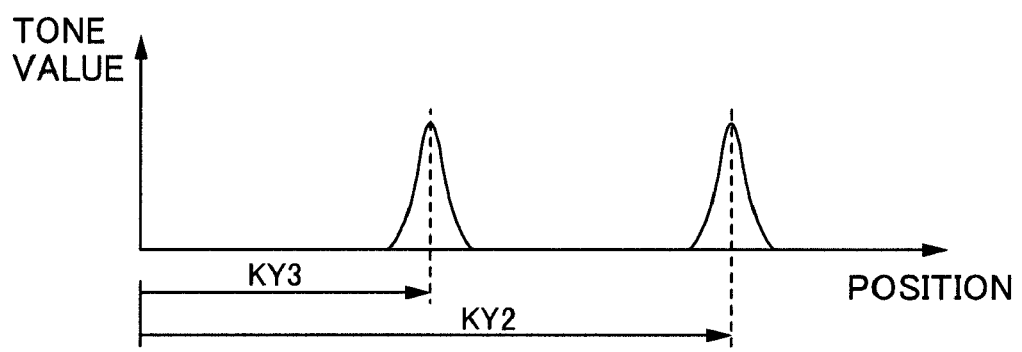
FIG. 15B is a graph of tone values of extracted pixels.

FIG. 15B is a graph of tone values of extracted pixels. The horizontal axis indicates pixel positions (Y coordinates). The vertical axis indicates the tone values of the pixels. The computer 110 obtains centroid pixels KY2 and KY3 respectively based on pixel data of the JY number of pixels that have been extracted.

Then, the computer 110 calculates a tilt θ of the line L1 using the following expression:

$$\theta = \tan^{-1}\{(KY2-KY3)/(KX2-KX3)\}$$

It should be noted that the computer 110 detects not only the tilt of the image of the measurement pattern but also the tilt of the image of the standard pattern. The method for detecting the tilt of the image of the standard pattern is substantially the same as the method above, and therefore description thereof is omitted.

Image Tilt Correction (S133)

Next, the computer 110 corrects the image tilt by performing a rotation process on the image based on the tilt θ detected at S132 (S133). The image of the measurement pattern is rotationally corrected based on a tilt result of the image of the measurement pattern, and the image of the standard pattern is rotationally corrected based on a tilt result of the image of the standard pattern.

A bilinear technique is used in an algorithm for processing rotation of the image. This algorithm is well known, and therefore description thereof is omitted.

Tilt Detection When Printing (S134)

Next, the computer 110 detects the tilt (skew) when printing the measurement pattern (S134). When the lower end of the test sheet passes the transport roller while printing the measurement pattern, sometimes the lower end of the test sheet contacts the head 41 and the test sheet moves. When this occurs, the correction values calculated using this measurement pattern become inappropriate. Consequently, whether or not the lower end of the test sheet has made contact with the head 41 is detected by detecting the tilt at the time of printing the measurement pattern, and if contact has been made, an error is given.

Figure 16:
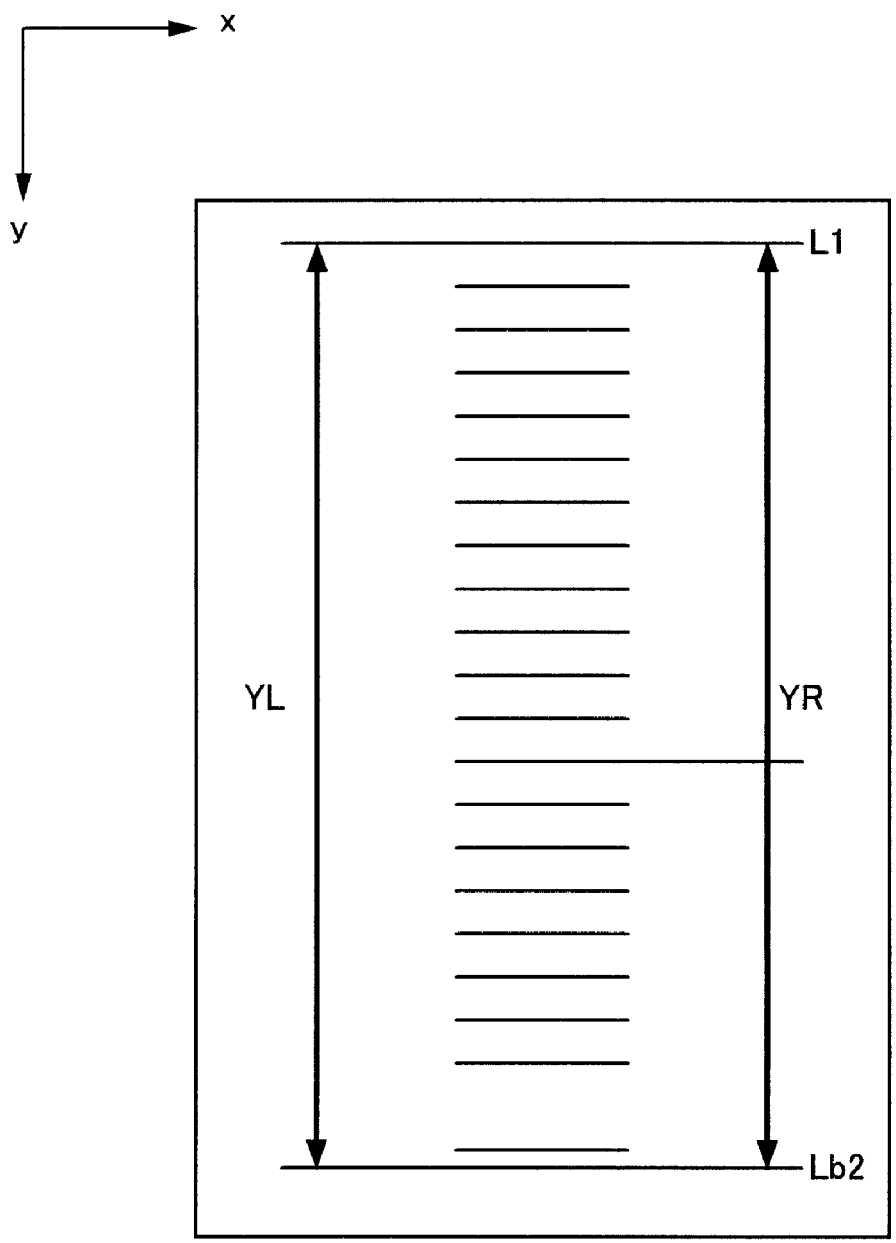
FIG. 16 is an explanatory diagram of a state in which tilt during printing of the measurement pattern is detected.

FIG. 16 is an explanatory diagram of a state in which tilt during printing of the measurement pattern is detected. First, the computer 110 detects a left side interval YL and a right side interval YR between the line L1 (the uppermost line) and the line Lb1 (the most bottom line, which is a line formed after the lower end has passed the transport roller). Then the computer 110 calculates a difference between the interval YL and the interval YR and proceeds to the next process (S135) if this difference is within a predetermined range, but gives an error if this difference is outside the predetermined range.

Calculating an Amount of White Space (S135)

Next, the computer 110 calculates the amount of white space (S135).

Figure 17:
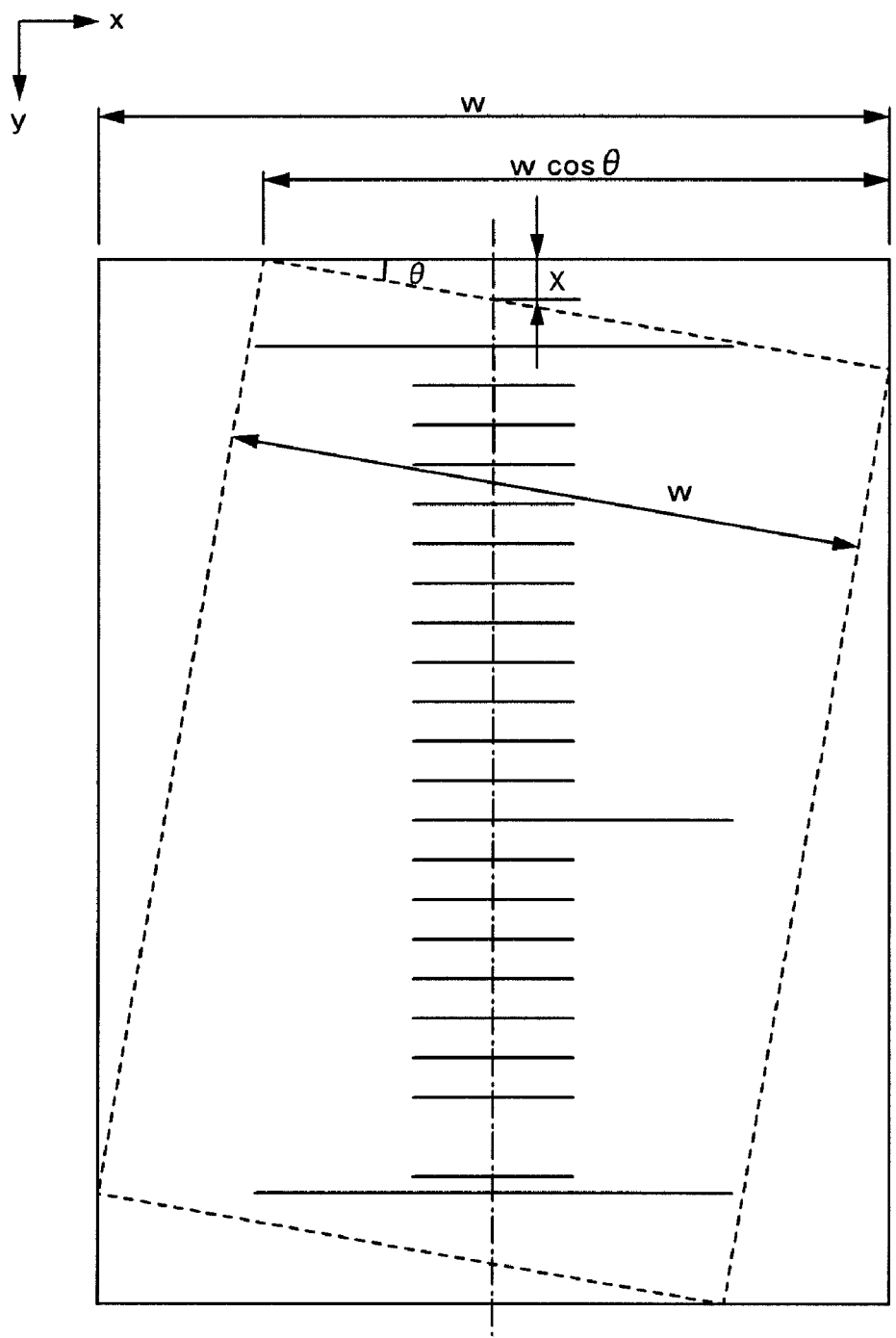
FIG. 17 is an explanatory diagram of a white space amount X.

FIG. 17 is an explanatory diagram of a white space amount X. The solid line quadrilateral (outer side quadrilateral) in the diagram indicates an image after rotational correction of S133. The dotted line quadrilateral (inner side diagonal quadrilateral) in FIG. 17 indicates an image prior to the rotational correction. In order to make a rectangular shape of the image after rotational correction, white spaces of right-angled triangle shapes are added to the corners of the rotated image when carrying out rotational correction processing at S133.

Supposing the tilt of the standard sheet SS and the tilt of the test sheet TS are different, the added white space amount will be different, and the positions of the lines in the measurement pattern with respect to the standard pattern will be relatively shifted before and after the rotational correction (S133). Accordingly, the computer 110 obtains the white space amount X using the following expression and prevents displacement of the lines of the measurement pattern with respect to the standard pattern by subtracting the white space amount X from the line positions calculated in S136.

$$X = (w \cos\theta - W/2) \times \tan\theta$$

Line Position Calculations in Scanner Coordinate System (S136)

Next, the computer 110 calculates the line positions of the standard pattern and the line positions of the measurement pattern respectively using a scanner coordinate system (S136).

The scanner coordinate system refers to a coordinate system when the size of one pixel is $1/720 \times 1/720$ inches. There is reading position error in the scanner 150 and when considering reading position error, strictly speaking the actual region corresponding to the pixel data does not become $1/720$ inches × $1/720$ inches, but in the scanner coordinate system the size of the region (pixels) corresponding to the pixel data is set to $1/720 \times 1/720$ inches. Furthermore, a position of the upper left pixel in each image is set as an origin in the scanner coordinate system.

Figure 18A:
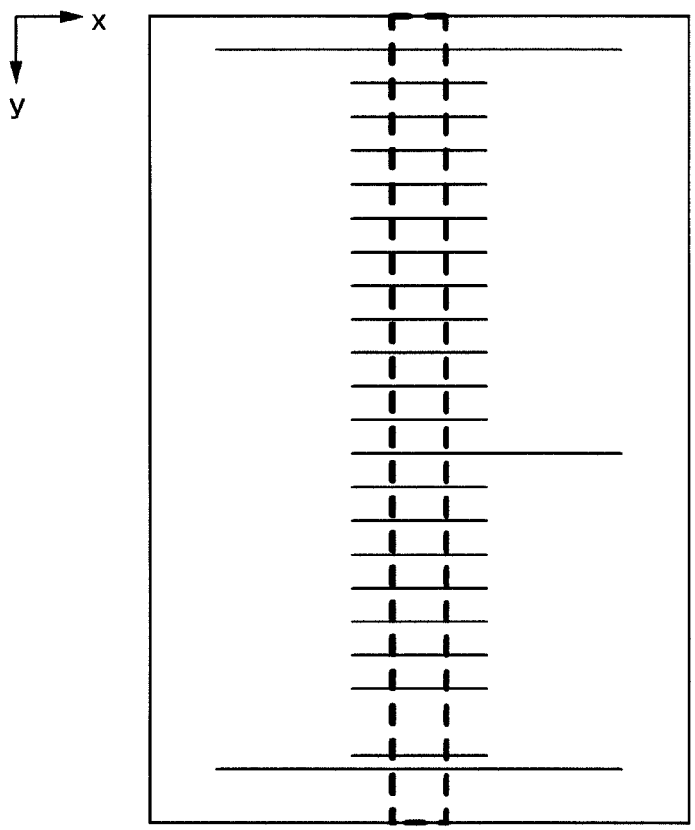
FIG. 18A is an explanatory diagram of an image range used in calculating line positions.
Figure 18B:
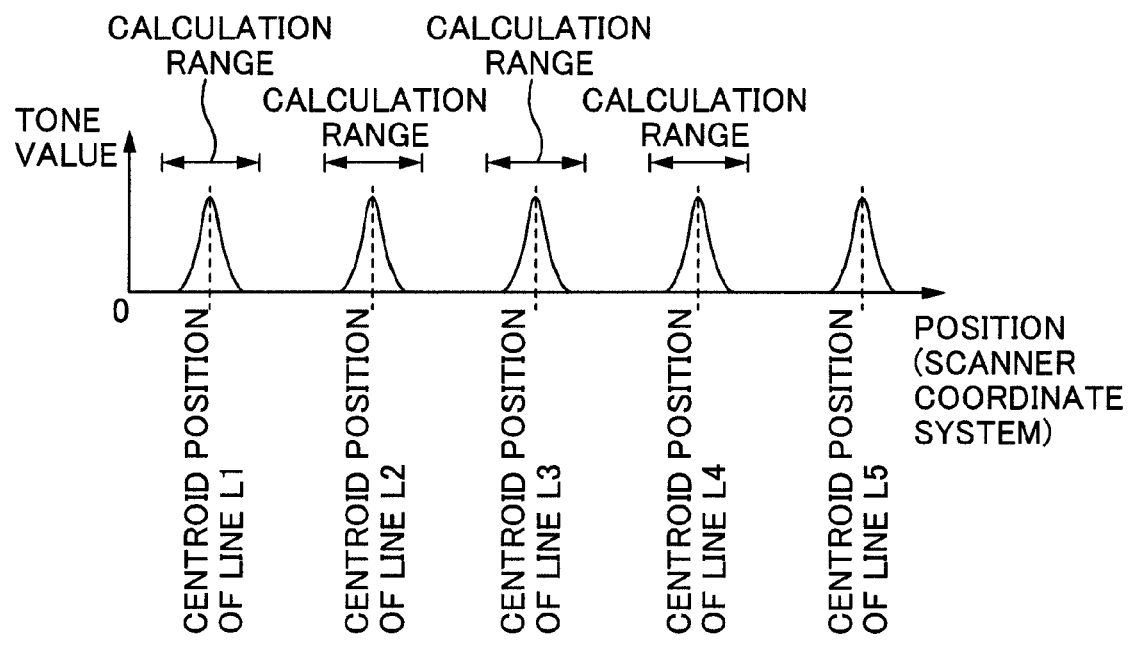
FIG. 18B is an explanatory diagram of calculating line positions.

FIG. 18A is an explanatory diagram of an image range used in calculating line positions. The image data of the image in the range indicated by the dotted line in FIG. 18A is used in calculating the line positions. FIG. 18B is an explanatory diagram of calculating line positions. The horizontal axis indicates pixel y direction positions (scanner coordinate system). The vertical axis indicates tone values of the pixels (average values of tone values of pixels lined up in the x direction).

The computer 110 obtains a position of a peak value of the tone values and sets a predetermined calculation range centered on this position. Then, based on the pixel data of pixels in this calculation range, a centroid position of the tone values is calculated, and this centroid position is set as the line position.

FIG. 19 is an explanatory diagram of calculated line positions (note that positions shown in the diagram have undergone a predetermined calculation to be made dimensionless). In regard to the standard pattern, despite being constituted by lines having uniform intervals, its detected line positions do not have uniform intervals when attention is given to the centroid positions of each line in the standard pattern. This is conceivably an influence of reading position error of the scanner 150.

Calculating Absolute Positions of Lines in Measurement Pattern (S137)

Next, the computer 110 calculates the absolute positions of lines in the measurement pattern (S137).

Figure 20:
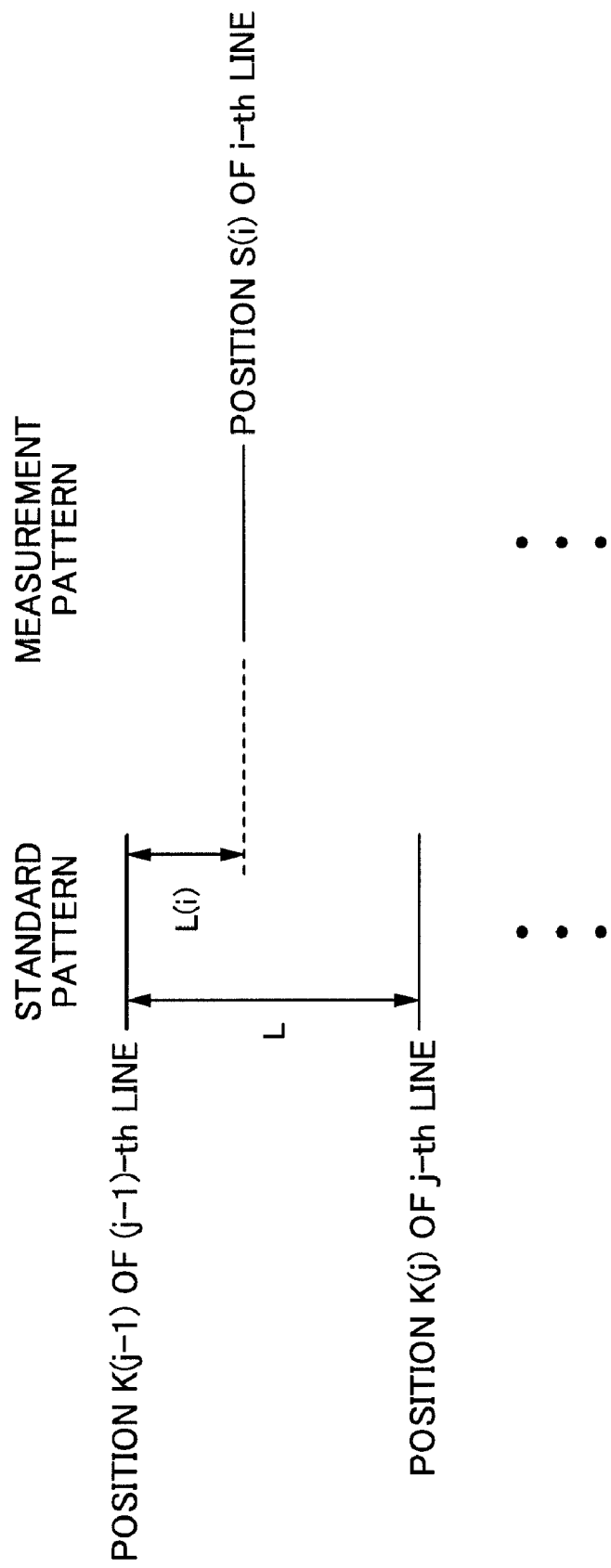
FIG. 20 is an explanatory diagram of calculating absolute positions of an i-th line in the measurement pattern.

FIG. 20 is an explanatory diagram of calculating absolute positions of an i-th line in the measurement pattern. Here, the i-th line of the measurement pattern is positioned between a (j−1)-th line of the standard pattern and a j-th line of the standard pattern. In the following description, the position (scanner coordinate system) of the i-th line in the measurement pattern is referred to as "S(i)" and the position (scanner coordinate system) of the j-th line in the standard pattern is referred to as "K(j)". Furthermore, the interval (y direction interval) between the (j−1)-th line and the j-th line of the standard pattern is referred to as "L" and the interval (y direction interval) between the (j−1)-th line of the standard pattern and the i-th line of the measurement pattern is referred to as "L(i)."

First, the computer 110 calculates a ratio H of the interval L(i) to the interval L based on the following expression:

$$H=L(i)/L=\{S(i)-K(j-1)\}/\{K(j)-K(j-1)\}$$

Incidentally, the standard pattern on the actual standard sheet SS has uniform intervals, and therefore when the absolute position of the first line of the standard pattern is set to zero, the position of an arbitrary line in the standard pattern can be calculated. For example, the absolute position of the second line in the standard pattern is 1/36 inch. Accordingly, when the absolute position of the j-th line in the standard pattern is given as "J(j)" and the absolute position of the i-th line in the measurement pattern is given as "R(i)," R(i) can be calculated as shown in the following expression:

$$R(i)=\{J(j)-J(j-1)\}\times H+J(j-1)$$

Here, description is given concerning a specific procedure for calculating the absolute position of the first line of the measurement pattern in FIG. 19. First, based on the value (373.768667) of S(1), the computer 110 detects that the first line of the measurement pattern is positioned between the second line and the third line of the standard pattern. Next, the computer 110 calculates that the ratio H is 0.40143008 (=(373.7686667−309.613250)/(469.430413−309.613250). Next, the computer 110 calculates that an absolute position R(1) of the first line of the measurement pattern is 0.98878678 mm (=0.038928613 inches ={1/36 inch}× 0.40143008+1/36 inch).

In this manner, the computer 110 calculates the absolute positions of lines in the measurement pattern.

Calculating Correction Values (S138)

Next, the computer 110 calculates correction values corresponding to transport operations of multiple times carried out when the measurement pattern is formed (S138). Each of the correction values is calculated based on a difference between a theoretical line interval and an actual line interval.

The correction value C(i) of the transport operation carried out between the pass i and the pass i+1 is a value in which "R(i+1)−R(i)" (the actual interval between the absolute position of the line Li+1 and the line Li) is subtracted from "6.35 mm" (1/4 inch, that is, the theoretical interval between the line Li and the line Li+1). For example, the correction value C(1) of the transport operation carried out between the pass 1 and the pass 2 is 6.35 mm−{R(2)−R(1)}. The computer 110 calculates the correction value C(1) to the correction value C(19) in this manner.

However, when calculating correction values using the lines Lb1 and Lb2, which are below the NIP line (upstream side in the transport direction), the theoretical interval between the line Lb1 and the line Lb2 is taken as "0.847 mm" (=3/90 inch). The computer 110 calculates the correction value Cb in the non NIP state in this manner.

Figure 21:
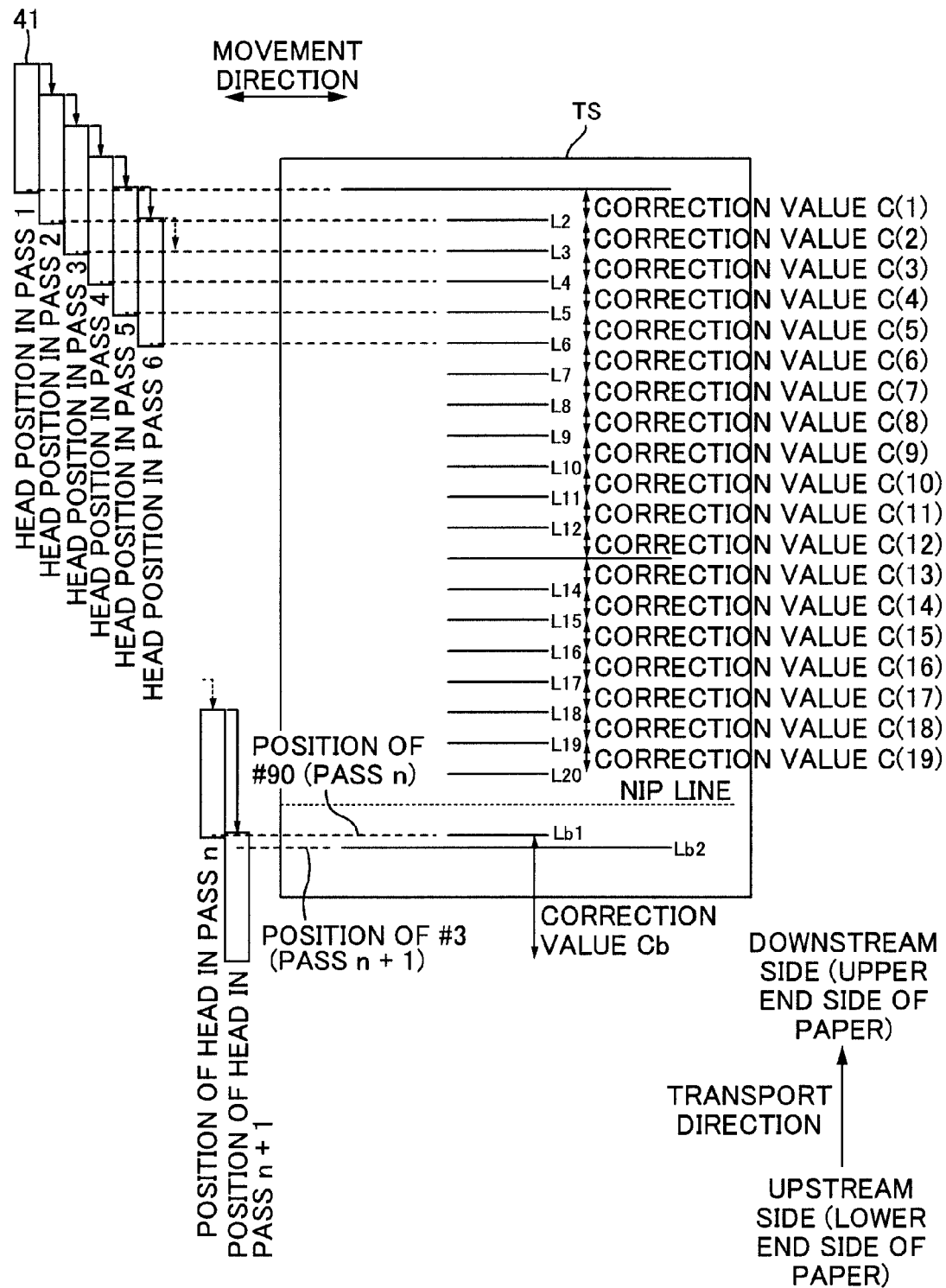
FIG. 21 is an explanatory diagram of a range corresponding to the correction values C(i).

FIG. 21 is an explanatory diagram of a range corresponding to the correction values C(i). Supposing that a value obtained by subtracting the correction value C(1) from the initial target transport amount is set as the target in the transport operation between the pass 1 and the pass 2 when printing the measurement pattern, then the actual transport amount should become precisely 1/4 inch (=6.35 mm). Similarly, supposing that a value obtained by subtracting the correction value Cb from the initial target transport amount is set as the target in the transport operation between the pass n and the pass n+1 when printing the measurement pattern, then the actual transport amount should become precisely 1 inch.

Averaging the Correction Values (S139)

In this regard, the rotary encoder 52 of this reference example is not provided with an origin sensor, and therefore although the controller 60 can detect the rotation amount of the transport roller 23, it does not detect the rotation position of the transport roller 23. For this reason, the printer 1 cannot guarantee the rotation position of the transport roller 23 at the commencement of transport. That is, each time printing is performed, there is a risk that the rotation position of the transport roller 23 is different at the commencement of transport. On the other hand, the interval between two adjacent lines in the measurement pattern is affected not only by the DC component transport error when transported by 1/4 inch, but is also affected by the AC component transport error.

Consequently, if the correction value C that is calculated based on the interval between two adjacent lines in the measurement pattern is applied as it is when correcting the target transport amount, there is a risk that the transport amount will not be corrected properly due to the influence of AC component transport error. For example, even when carrying out a transport operation of the 1/4 inch transport amount between the pass 1 and the pass 2 in the same manner as when printing the measurement pattern, if the rotation position of the transport roller 23 at the commencement of transport is different to that at the time of printing the measurement pattern, then the transport amount will not be corrected properly even though the target transport amount is corrected with the correction value C(1). If the rotation position of the transport roller 23 at the commencement of transport is 180° different compared to the time of printing the measurement pattern, then due to the influence of AC component transport error, not only will the transport amount not be corrected properly, it is possible that the transport error will actually be worsened.

Accordingly, here, in order to correct only the DC component transport error, a correction amount Ca for correcting only DC component transport error is calculated by averaging four correction values C as in the following expression:

$$Ca(i)=\{C(i-1)+C(i)+C(i+1)+C(i+2)\}/4$$

Here, description is given of a reason for being able to calculate the correction values Ca for correcting DC component transport error by the above expression.

As stated earlier, the correction value C(i) of the transport operation carried out between the pass i and the pass i+1 is a value in which "R(i+1)−R(i)" (the actual interval between the absolute position of the line Li+1 and the line Li) is subtracted from "6.35 mm" (¼ inch, that is, the theoretical interval between the line Li and the line Li+1). By doing this, the above expression for calculating the correction values Ca possesses a meaning as in the following expression:

$$Ca(i)=[25.4\text{ mm}-\{R(i+3)-R(i-1)\}]/4$$

That is, the correction value Ca(i) is a value in which a difference between an interval of two lines that should be separated by one inch theoretically (the line Li+3 and the line Li−1) and one inch (the transport amount of one rotation of the transport roller 23) is divided by four. In other words, the correction value Ca(i) is a value corresponding to the interval between a line Li−1 and a line Li+3, which is formed after one inch of transport has been performed after the forming of the line Li−1.

Therefore, the correction values Ca(i) calculated by averaging four correction values C are not affected by AC component transport error and are values that reflect DC component transport error.

It should be noted that the correction value Ca(2) of the transport operation carried out between the pass 2 and the pass 3 is calculated to be a value obtained by dividing a sum total of the correction values C(1) to C(4) by four (an average value of the correction values C(1) to C(4)). In other words, the correction value Ca(2) is a value corresponding to the interval between the line L1 formed in the pass 1 and the line L5 formed in the pass 5 after one inch of transport has been performed after the forming of the line L1.

Furthermore, when i−1 becomes zero or less in calculating the correction values Ca(i), C(1) is applied for the correction value C(i−1). For example, the correction value Ca(1) of the transport operation carried out between the pass 1 and the pass 2 is calculated as {C(1)+C(1)+C(2)+C(3)}/4. Furthermore, when i+1 becomes 20 or more in calculating the correction values Ca(i), C(19) is applied for C(i+1) for calculating the correction value Ca. Similarly, when i+2 becomes 20 or more, C(19) is applied for C(i+2). For example, the correction value Ca(19) of the transport operation carried out between the pass 19 and the pass 20 is calculated as {C(18)+C(19)+C(19)+C(19)}/4.

The computer 110 calculates the correction values Ca(1) to the correction value Ca(19) in this manner. In this way, the correction values for correcting DC component transport error are obtained for each ¼ inch range.

Storing Correction Values (S104)

Next, the computer 110 stores the correction values in the memory 63 of the printer 1 (S104).

Figures 22, 23A:
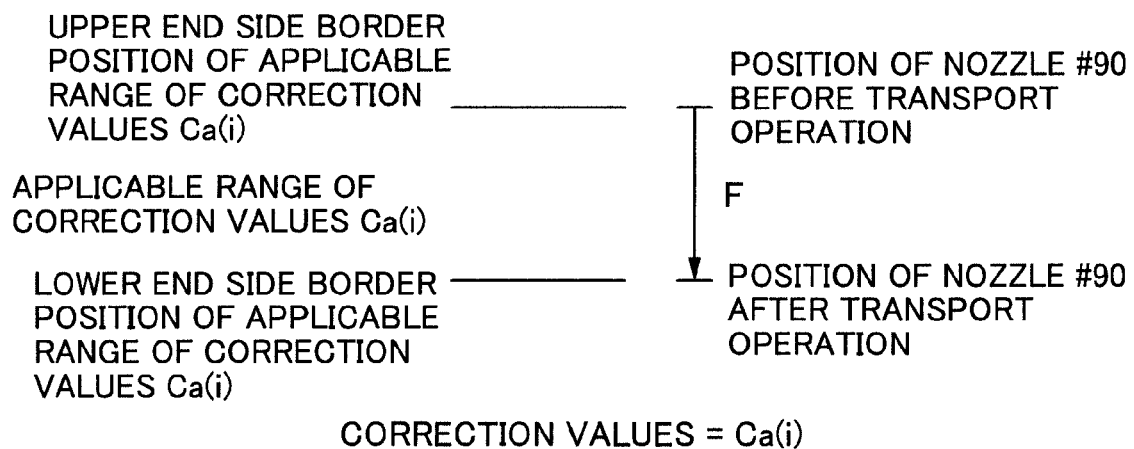
FIG. 22 is an explanatory diagram of a table stored in a memory 63.
FIG. 23A is an explanatory diagram of correction values in a first case.

FIG. 22 is an explanatory diagram of a table stored in the memory 63. The correction values stored in the memory 63 are correction values Ca(1) to Ca(19) in the NIP state and the correction value Cb in the non NIP state. Furthermore, border position information for indicating the range in which the correction values are applied is also associated with each correction value and stored in the memory 63.

The border position information associated with the correction values Ca(i) is information that indicates a position (theoretical position) corresponding to the line Li+1 in the measurement pattern, and this border position information indicates a lower end side border of the range in which the correction values Ca(i) are applied. It should be noted that the upper end side border can be obtained from the border position information associated with the correction value Ca(i−1). Consequently, the applicable range of the correction value C(2) for example is a range between the position of the line L1 and the position of the line L2 with respect to the paper S (at which nozzle #90 is positioned). It should be noted that the range for the non NIP state is already known, and therefore there is no need to associate border position information with the correction value Cb.

At the printer manufacturing factory, a table reflecting the individual characteristics of each individual printer is stored in the memory 63 for each printer that is manufactured. Then, the printer in which this table has been stored is packaged and shipped.

Transport Operation during Printing by Users

When printing is carried out by a user who has purchased the printer, the controller 60 reads out the table from the memory 63 and corrects the target transport amount based on the correction values, then carries out the transport operation based on the corrected target transport amount. The following is a description concerning a state of the transport operation during printing by the user.

FIG. 23A is an explanatory diagram of correction values in a first case. In the first case, the position of the nozzle #90 before the transport operation (the relative position with respect to the paper) matches the upper end side border position of the applicable range of the correction values Ca(i), and the position of the nozzle #90 after the transport operation matches the lower end side border position of the applicable range of the correction values Ca(i). In this case, the controller 60 sets the correction values to Ca(i), sets as a target a value obtained by adding the correction value Ca(i) to an initial target transport amount F, then drives the transport motor 22 to transport the paper.

Figure 23B:
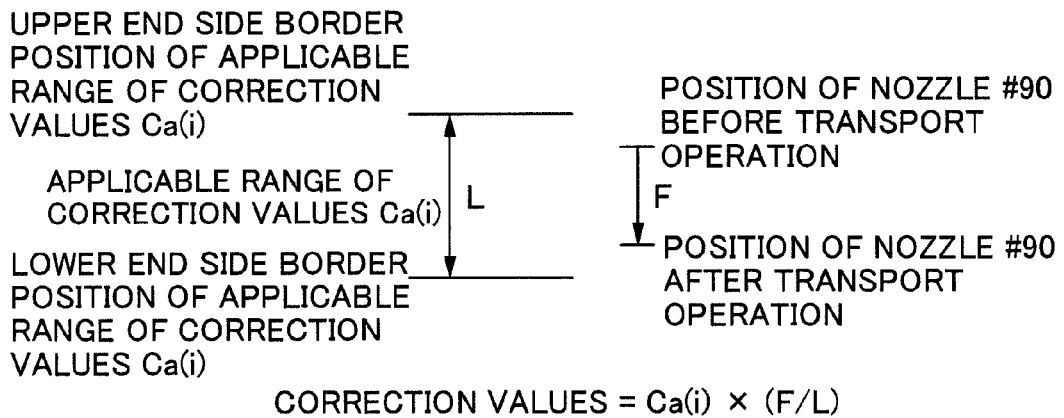
FIG. 23B is an explanatory diagram of correction values in a second case.

FIG. 23B is an explanatory diagram of correction values in a second case. In the second case, the positions of the nozzle #90 before and after the transport operation are both within the applicable range of the correction values Ca(i). In this case, the controller 60 sets as a correction value a value obtained by multiplying a ratio F/L between the initial target transport amount F and a transport direction length L of the applicable range by Ca(i). Then, the controller 60 sets as a target a value obtained by adding the correction value Ca(i) multiplied by (F/L) to the initial target transport amount F, then drives the transport motor 22 and transports the paper.

Figure 23C:
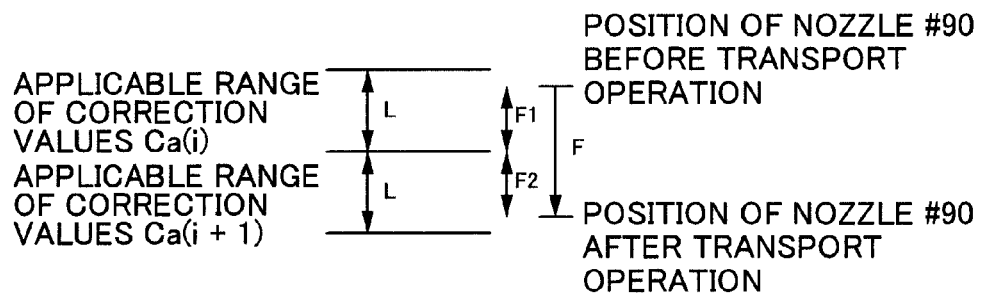
FIG. 23C is an explanatory diagram of correction values in a third case.

FIG. 23C is an explanatory diagram of correction values in a third case. In the third case, the position of the nozzle #90 before the transport operation is within the applicable range of the correction values Ca(i), and the position of the nozzle #90 after the transport operation is within the applicable range of the correction values Ca(i+1). Here, of the target transport amounts F, the transport amount in the applicable range of the correction values Ca(i) is set as F1, and the transport amount in the applicable range of the correction values Ca(i+1) is set as F2. In this case, the controller 60 sets as the correction value a sum of a value obtained by multiplying Ca(i) by F1/L and a value obtained by multiplying Ca(i+1) by F2/L. Then, the controller 60 sets as a target a value obtained by adding the correction value to the initial target transport amount F, then drives the transport motor 22 and transports the paper.

Figure 23D:
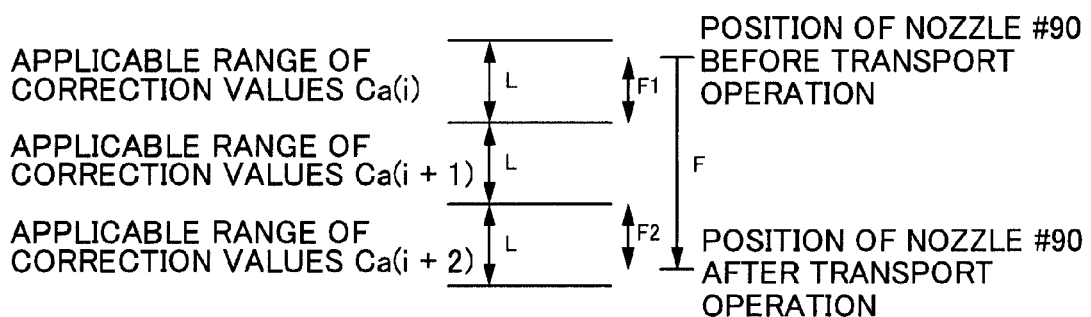
FIG. 23D is an explanatory diagram of correction values in a fourth case.

FIG. 23D is an explanatory diagram of correction values in a fourth case. In the fourth case, the paper is transported so as to pass the applicable range of the correction values Ca(i+1). In this case, the controller 60 sets as the correction value a sum of a value obtained by multiplying Ca(i) by F1/L, Ca(i+1), and a value obtained by multiplying Ca(i+2) by F2/L. Then, the controller 60 sets as a target a value obtained by adding the correction value to the initial target transport amount F, then drives the transport motor 22 and transports the paper.

In this way, when the controller corrects the initial target transport amount F and controls the transport unit based on the corrected target transport amount, the actual transport amount is corrected so as to become the initial target transport amount F, and the DC component transport error is corrected.

Incidentally, in calculating the correction values as described above, when the target transport amount F is small, the correction value will also be a small value. If the target transport amount F is small, it is conceivable that the transport error produced when carrying out the transport will also be small, and therefore by calculating the correction values in the above manner, correction values that match the transport error produced during transport can be calculated. Furthermore, an applicable range is set for each ¼ inch with respect to the correction values Ca, and therefore this enables the DC component transport error, which fluctuates in response to the relative positions of the paper S and the head 41 to be corrected accurately.

With the transport amount corrections of the foregoing reference example, tables of correction values were stored and transport amount corrections were carried out at the time of transporting paper by using these correction values, but transport amount corrections such as these could not be performed for papers of a size for which a correction value table was not stored. Accordingly, a method is desirable by which transport amount corrections can be carried out as in the reference example even in a case of transporting a paper of a size for which a correction value table is not stored.

In the embodiments shown below, transport amount corrections can be supported even in a case of transporting a paper of a size for which a correction value table is not stored by not using predetermined correction values among those of a correction value table or by using predetermined correction values a plurality of times.

First Embodiment

When Transporting Papers of Smaller Sizes

First, in a first embodiment, description is given of a case of printing a paper smaller than a size of a paper for which a correction value table is stored in the memory 63. At this time, it is assumed that a correction value table corresponding to a size of 101.6 mm×152.4 mm (4 inch×6 inch: hereinafter referred to as "4×6-size") is stored in the memory 63. And description is given of a case of transporting a paper that is 89 mm×127 mm (hereinafter referred to as "L-size"), which is a size for which a correction value table is not stored.

Figure 24:
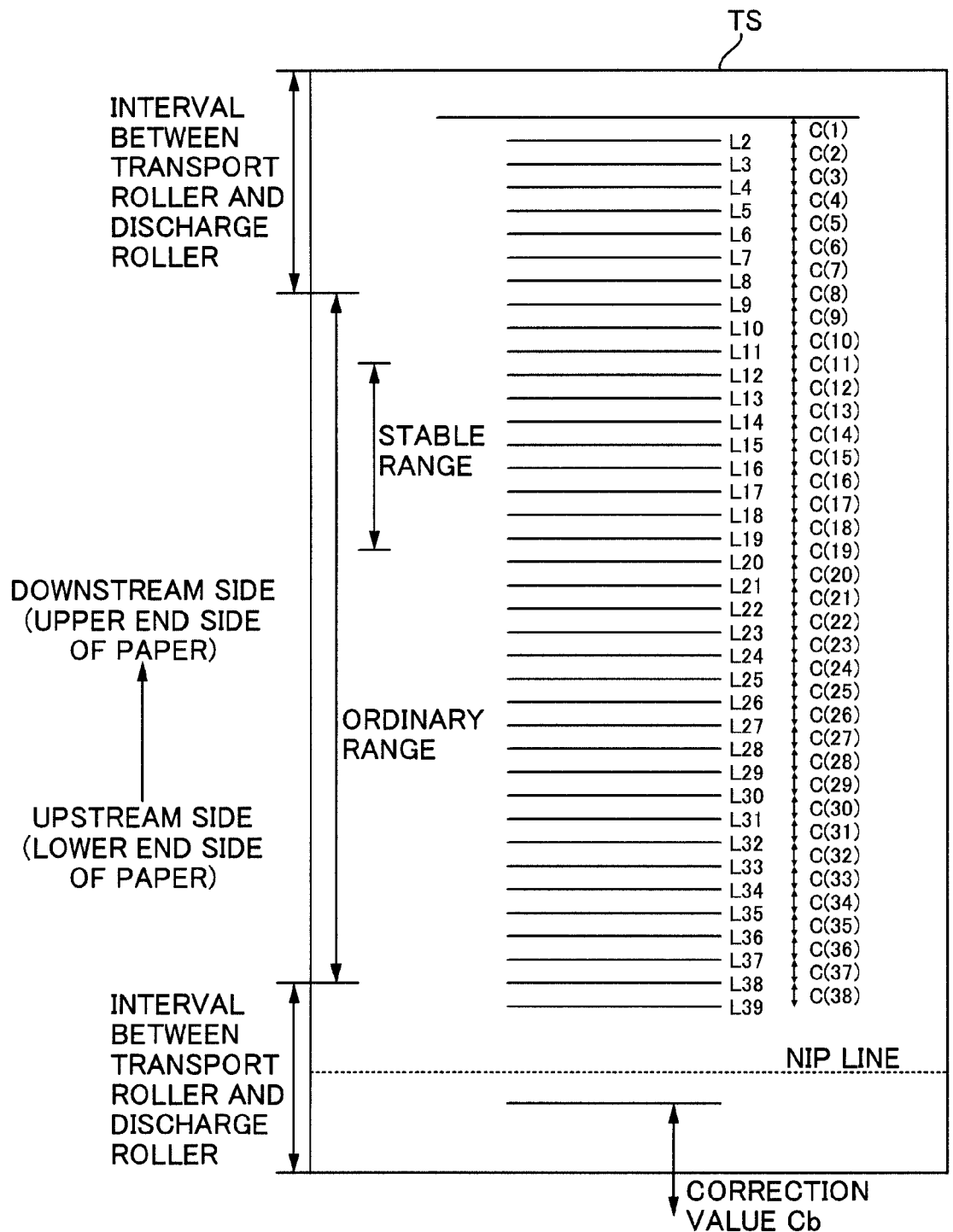
FIG. 24 is an explanatory diagram of a range corresponding to correction values C(i) applied to 4×6-size paper in a first embodiment.

FIG. 24 is an explanatory diagram of a range corresponding to the correction values C(i) applied to 4×6-size paper in the first embodiment. In the first embodiment, the line interval is ⅛ inch when transport of the test sheet TS has been carried out ideally. A reason for the line interval being narrowed in this manner is to maintain a higher transport accuracy than in the foregoing reference example.

In the reference example, the line interval was ¼ inch when there was no transport error and paper transport was carried out ideally. Thus, the number of lines in the first embodiment is greater than the number of lines shown in the reference example. In the first embodiment, the lines that are used are L1 to L39. The correction values that are prepared corresponding to these are C(1) to C(38). It should be noted that the way in which the correction values C are obtained at this time is the same method as in the reference example.

In the first embodiment, the calculation of the correction values Ca for correcting DC component transport error is carried out by averaging eight correction values C as in the following expression.

$$Ca(i) = \{C(i-3)+C(i-2)+C(i-1)+C(i)+C(i+1)+C(i+2)+C(i+3)+C(i+4)\}/8$$

It should be noted that here also, when i−3, i−2, or i−1 is zero or less in calculating the correction values Ca(i), C(1) is applied for the correction values C(i−3) to C(i−1). Furthermore, when i+1 is 38 or greater in calculating the correction values Ca(i), C(38) is applied for C(i+1) to C(i+4) for calculating the correction values Ca.

In this manner, the correction value Ca(1) to the correction value Ca(38) are calculated. In this way, the correction values for correcting DC component transport error are obtained for each ⅛ inch range.

FIG. 25 is an explanatory diagram of a table (4×6-size) being stored in the memory 63. The border position information associated with the correction values Ca(i) is information that indicates a position (theoretical position) corresponding to the line Li+1 in the measurement pattern, and this border position information indicates a lower end side border of the range in which the correction values Ca(i) are applied. Here, there are correction values Ca(1) to Ca(38). In the first embodiment, printing is carried out for an L-size paper, which is a size smaller than 4×6-size, while correcting the transport error based on the correction values Ca.

In this regard, as stated earlier, the paper is transported by the transport roller 23 and the discharge roller 25. As a matter of course, it is considered that transport error fluctuation increases when the paper is being transported by only one of the two rollers, and the transport error fluctuation decreases when the paper is being transported by both rollers.

Here, the border positions corresponding to the relative positions of the head and the paper when the paper S is transported by both the transport roller and the discharge roller are set as border positions of an ordinary range. On the other hand, the border positions corresponding to the relative positions of the head and the paper when being transported by one of either the transport roller or the discharge roller are set as border positions of a non-ordinary range. In other words, the non-ordinary range is a range of a width between the transport roller and the discharge roller in the printer 1, from respective end areas of the paper in the transport direction. And regions other than the non-ordinary range are the ordinary range.

Among border positions in the ordinary range there are border positions of a stable range that correspond to areas having even less transport error fluctuation. Border positions of the stable range are border positions that correspond to the relative positions of the head and the paper when the paper S is transported by the transport roller and the discharge roller, and a predetermined region of the paper S is being fed while being bent by a paper feed platform (paper feed tray). Specifically, this involves border positions corresponding to the relative positions when in a state in which the trailing area of the paper is being fed while being in contact with the paper feed tray. It is thought that transport error fluctuation decreases further since the insertion force of the paper into the transport roller is stable when the paper S is inserted into the transport roller while being bent by the paper feed platform.

Figure 26A:
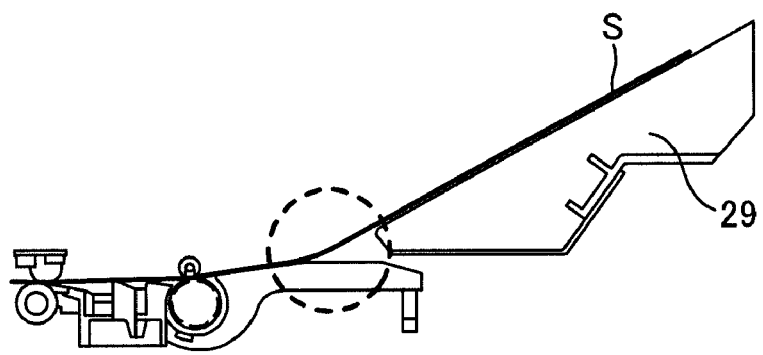
FIG. 26A shows a paper position at an initial stage when the paper is transported by the transport roller and the discharge roller.
Figure 26B:
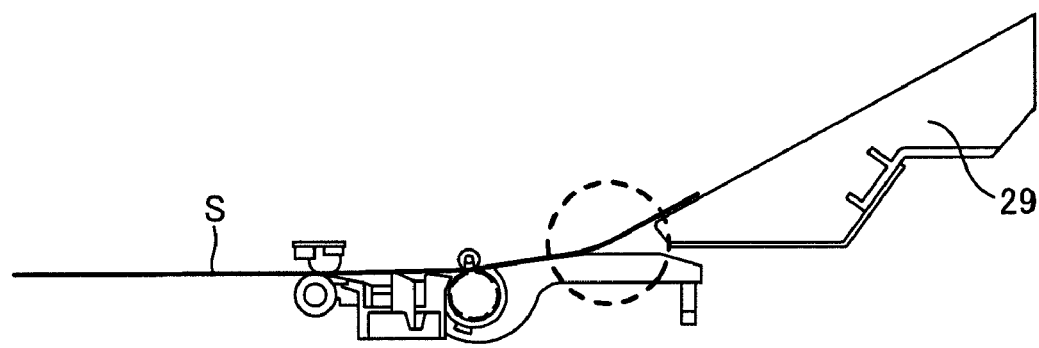
FIG. 26B shows a paper position at a later stage when the paper is transported by the transport roller and the discharge roller.

FIG. 26A shows a paper position at an initial stage when the paper is transported by the transport roller and the discharge roller. At the initial stage, an upper end vicinity of the paper (vicinity of a downstream side of the paper) is sandwiched between the transport roller and the discharge roller. Then a major portion of the trailing end of the paper is in contact with the paper feed platform 29. FIG. 26B shows a paper position at a later stage when the paper is transported by the transport roller and the discharge roller. At the later stage, a portion of a trailing end vicinity of the paper (vicinity of an upstream side of the paper) in contact with the paper feed platform 29 has become less.

When referencing FIG. 26A, there is a location (the location surrounded by the dotted line in the diagram) between the paper feed platform 29 and the transport roller where the paper is bending. An amount of bending of the paper here is considered to be an amount of bending that is substantially the same from the initial stage of the paper transport until the beginning of the later stage. On the other hand, when referencing FIG. 26B, at the later stage, almost all of the upstream side of the paper is not in contact with the paper feed platform 29, and the amount of bending at the location surrounded by the dotted line in the diagram changes greatly along with the transport of the paper.

Change in the amount of bending of the paper has an effect on change in the transport error. Thus, in the transport of the paper at the initial stage where there is little change in the amount of bending of the paper, the amount of transport error fluctuation is small, although transport error is produced. The relative position of the paper in the initial stage where there is little change in the amount of bending of the paper is when the downstream side portion of the paper is near the head. Thus, compared to the amount of transport error fluctuation when the upstream side portion of the paper is near the head, the amount of transport error fluctuation when the downstream side portion of the paper is near the head is conceivably smaller.

In this regard, it would appear that the portion in which there is little change in the amount of bending is reduced when the size of the paper is smaller. Considering this, it is conceivable that a graph can be obtained of presumed transport error when the size of the paper is smaller by removing the transport error of the portion in which there is little change in the amount of bending from a graph of transport error of a larger size paper.

Since correction values are values that offset transport error, they can be thought of as values inverse to the positive or negative values of transport error. Thus, when a correction value table of a smaller size paper is to be generated from a correction value table of a paper of a predetermined size, this can be generated by deleting the correction values corresponding to the aforementioned portion in which there is little change in the amount of bending. In this case, since it is desirable to delete as much as possible correction values corresponding to the portion where there is little transport error fluctuation, it is desirable to delete correction values continuously in order from the correction values corresponding to when the downstream side portion of the paper is near the head.

On the other hand, when a correction value table of a larger size paper is to be generated from a table of a paper of a predetermined size, this can be generated by interpolating correction values that are lacking by using a plurality of times the correction values of the aforementioned portion in which there is little change in the amount of bending. This would appear to be because when the size of the paper to be transported is larger, there is an increase in the aforementioned portion in which there is little change in the amount of bending.

The border positions in the stable range are determined in advance in accordance with the paper size. Here, L12 to L19 are determined as border positions Li in the stable range of a 4×6-size paper. The correction values associated with the border position information indicating positions (theoretical positions) corresponding to the lines L at this time are Ca(11) to Ca(18). In the first embodiment, the correction values in this stable range are deleted to generate a correction value table for a small paper when generating a correction value table for a smaller paper based on a 4×6-size correction value table.

Figure 27:
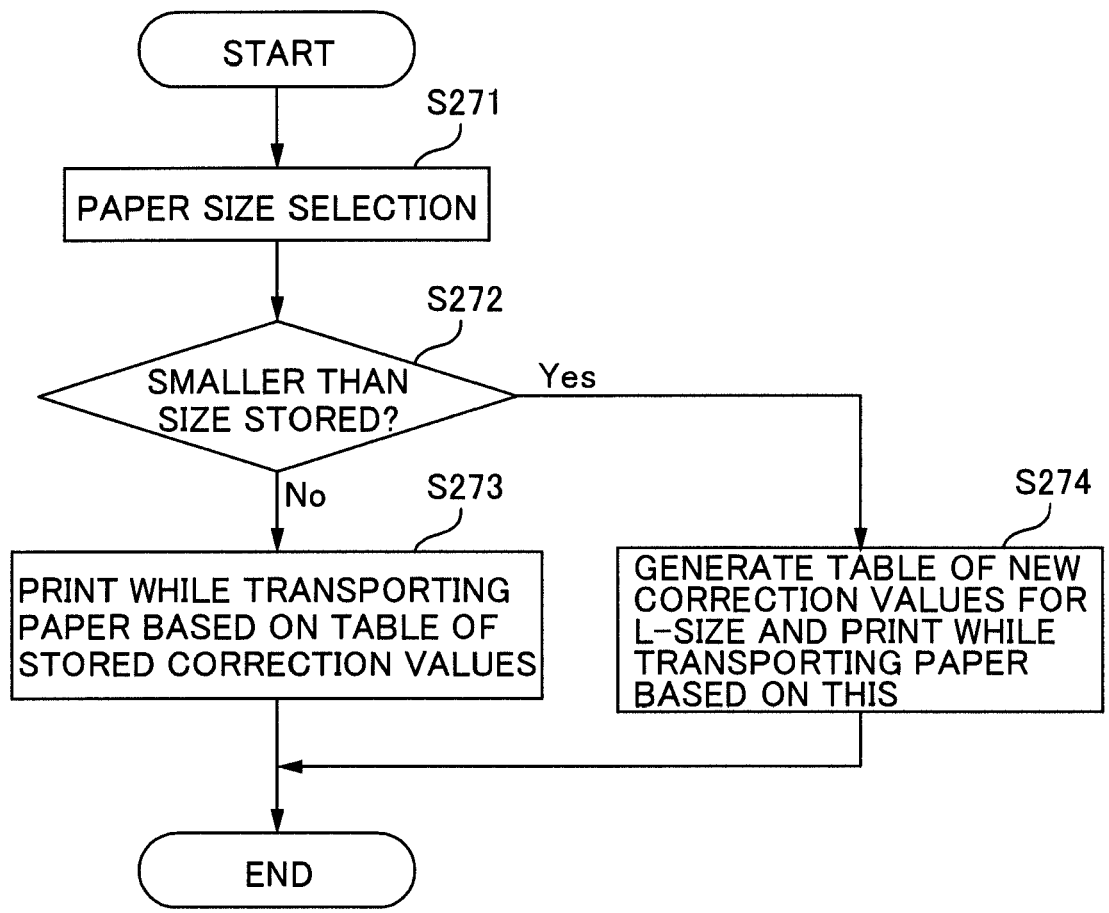
FIG. 27 is a flowchart for describing transport amount corrections in a case where a smaller size paper is to be transported.

FIG. 27 is a flowchart for describing transport amount corrections in a case where a smaller size paper is to be transported. When an instruction for printing is given from an application running on the computer 110, the computer 110 displays a user interface on the screen and prompts the user to select the size of the paper to be printed. In response to this, the user selects the size of paper desired to be printed. Data relating to the selected size of paper is sent from the computer 110 to the controller 60 of the printer 1 (S271).

When the data relating to the selected size of paper is sent to the controller 60, the controller 60 determines whether the size of that paper is smaller than a size of paper or a same size as that for which a table is stored in the memory 63 (S272). Here, no determination is made in regard to case where the size of the paper is larger than a size of paper for which a table is stored in the memory 63, but description is given later in regard to handling a case where the paper size is large.

In the first embodiment, a correction value table for the above-mentioned 4×6-size is stored in the memory 63. Thus, when the selected paper is 4×6-size, the controller 60 carries out printing while correcting the transport error using the correction value table for 4×6-size stored in the memory 63 (S273). It should be noted that the operation by which transport of the paper is carried out while correcting the transport error is the same operation as carried out in the reference example, and therefore description thereof is omitted.

On the other hand, when an L-size paper is selected (L-size is smaller than 4×6-size), the controller 60 generates an L-size correction value table such as that shown in FIG. 28 by deleting the Ca(11) to Ca(18) correction values from the 4×6-size table as described above and carries out printing while correcting transport error based on these (S274). This is carried out in a following manner.

First, let's examine what number of correction values have to be deleted from the 4×6-size when generating an L-size correction value table. Here, the number of border positions to be used is determined for each paper. For 4×6-size it was 39 positions, but 31 border positions are used for L-size. Thus, in accordance with this, there are eight extra correction values. Since there are 38 correction values for 4×6-size, it is evident that eight correction values should be deleted to obtain 30 correction values. Accordingly, eight correction values are deleted from the stable range.

FIG. 28 shows an L-size table generated based on a 4×6-size table. Here, the L-size correction value table that is newly generated is one in which Ca(11) to Ca(18) of the 4×6-size correction values Ca(1) to Ca(38) are deleted. Thus, for these deleted correction values, the correction values of Ca(19) to Ca(38) become respectively in correspondence with the theoretical position corresponding to L12 to the theoretical position corresponding to L31.

Of the correction values corresponding to when the paper is being transported by both the transport roller 23 and the discharge roller 25, the correction values corresponding to the relative positions when the downstream side portion of the paper is below the head are Ca(11) to C(19) (C(19) is a correction value corresponding to the relative position when a center of the paper is below the head). And Ca(11) to Ca(18) are correction values corresponding to seven continuous relative positions among the correction values associated with the relative positions when the downstream side portion of the paper S is below the head.

Here, description was given using 4×6-size and L-size papers as a typical example, but the sizes of the papers are not limited to these. Furthermore, here in regards to the paper type (plain paper, matte paper and the like), the same paper type is used herein. When the paper types are different, the coefficients of friction of the papers vary overall, and therefore in line with this the correction values are also offset overall, but this point is described later.

Figure 29A:
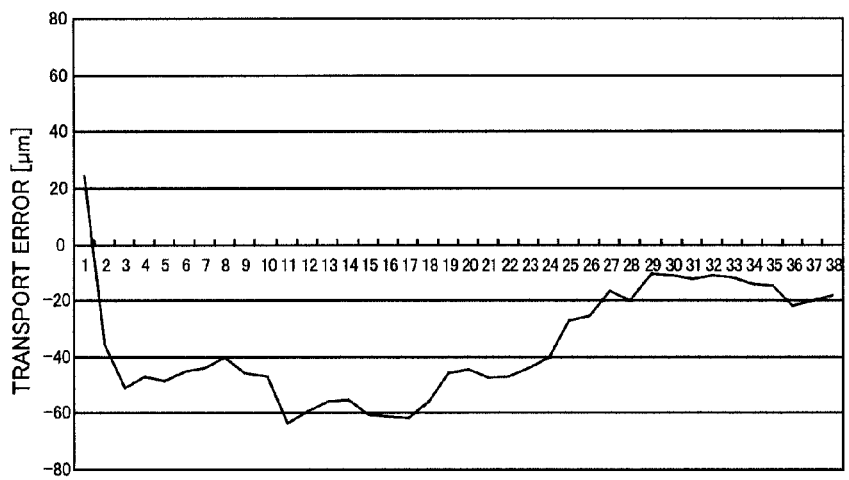
FIG. 29A is a graph indicating transport error of 4×6-size obtained by actual measurements in regard to a paper type A.
Figure 29B:
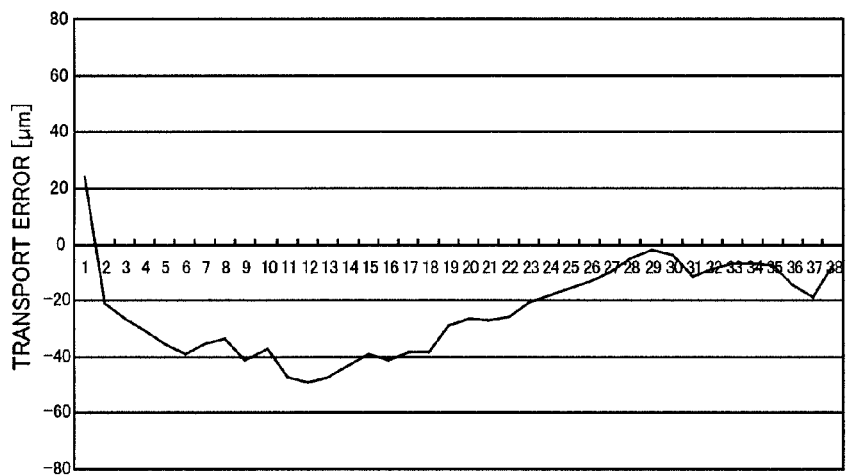
FIG. 29B is a graph indicating transport error of 4×6-size obtained by actual measurements in regard to a paper type B.
Figure 29C:
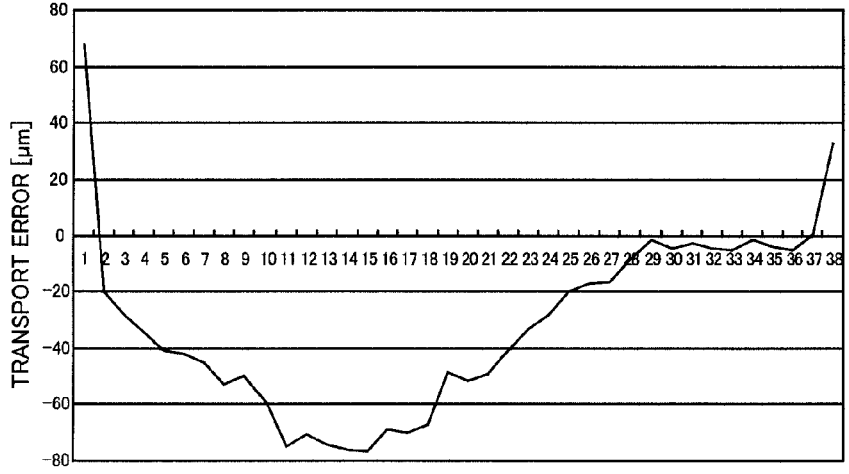
FIG. 29C is a graph indicating transport error of 4×6-size obtained by actual measurements in regard to a paper type C.

FIG. 29A is a graph indicating transport error of 4×6-size obtained by actual measurements in regard to a paper type A. FIG. 29B is a graph indicating transport error of 4×6-size obtained by actual measurements in regard to a paper type B. FIG. 29C is a graph indicating transport error of 4×6-size obtained by actual measurements in regard to a paper type C. The vertical axes in these graphs indicate transport error. And numbers on the horizontal axes in these graphs indicate correction value numbers x of correction values Ca(x).

Figure 30A:
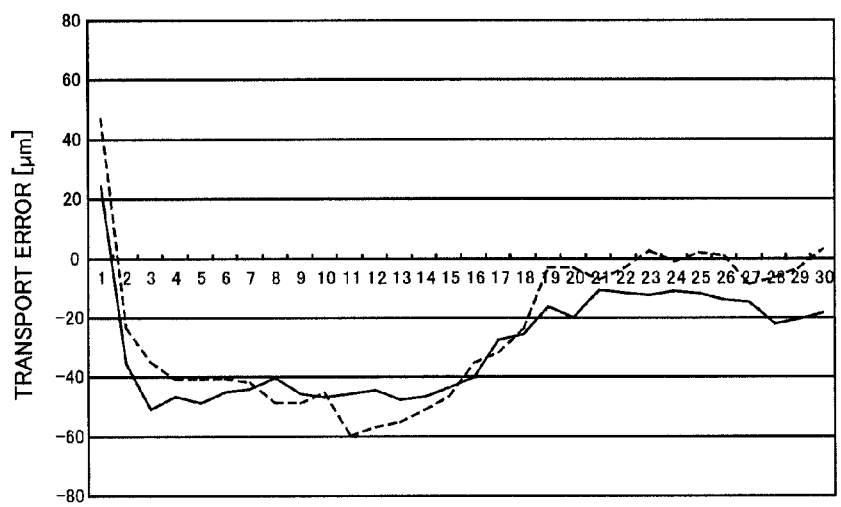
FIG. 30A is a graph indicating L-size transport error (solid line) obtained from 4×6-size transport error and L-size transport error (dashed line) obtained from actual measurements for paper type A.
Figure 30B:
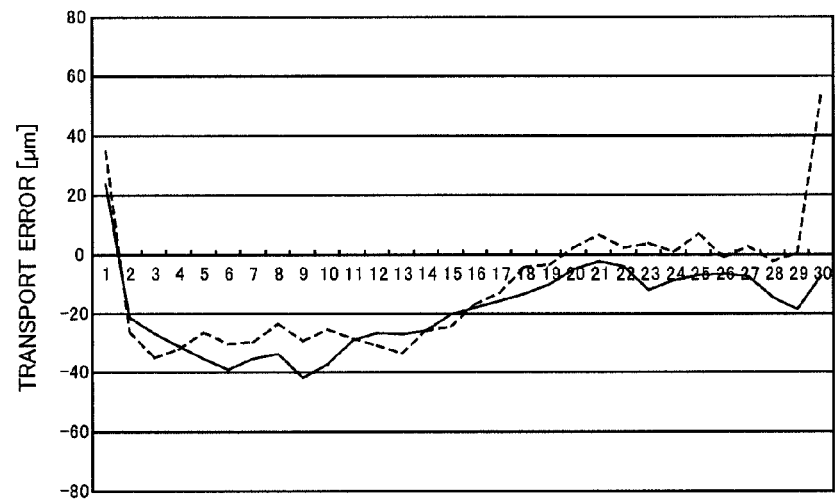
FIG. 30B is a graph indicating L-size transport error (solid line) obtained from 4×6-size transport error and L-size transport error (dashed line) obtained from actual measurements for paper type B.
Figure 30C:
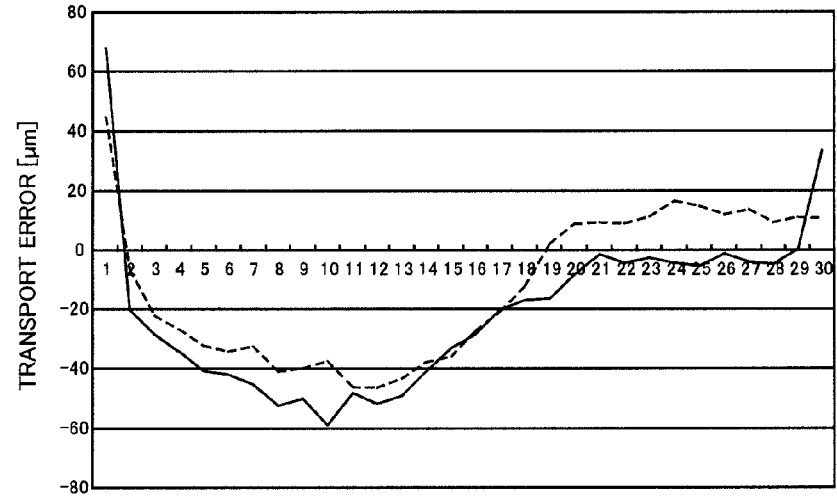
FIG. 30C is a graph indicating L-size transport error (solid line) obtained from 4×6-size transport error and L-size transport error (dashed line) obtained from actual measurements for paper type C.

FIG. 30A is a graph indicating L-size transport error (solid line) obtained from 4×6-size transport error and L-size transport error (dashed line) obtained from actual measurements for paper type A. FIG. 30B is a graph indicating L-size transport error (solid line) obtained from 4×6-size transport error and L-size transport error (dashed line) obtained from actual measurements for paper type B. FIG. 30C is a graph indicating L-size transport error (solid line) obtained from 4×6-size transport error and L-size transport error (dashed line) obtained from actual measurements for paper type C. The L-size transport error obtained from the 4×6-size transport error was generated by deleting transport error corresponding to the positions L12 to L19 and shifting the transport error of L20 onward so as to become the transport error of L12 onward.

When comparing the L-size transport error obtained from 4×6-size transport error and L-size transport error obtained from actual measurements for the respective paper types of FIG. 30A to FIG. 30C, it is evident that tendencies in the transport error are closely matched. This indicates that to a certain extent the L-size transport error can be estimated from the 4×6-size transport error (FIG. 29A to FIG. 29C).

If corrections can be carried out so as to offset the amount of transport error that is produced, then highly accurate transport can be carried out. In other words, transport error can be considered to involve substituting in positive and negative correction values Ca. Thus, in regard to correction values, by deleting correction values corresponding to the stable range, transport amount corrections can be supported by generating a correction value table for smaller size papers.

By doing this, a correction value table can be generated for small size papers based on a correction value table for a predetermined size of paper, and therefore paper transport can be carried while correcting transport error even in a case of carrying out printing of a paper size for which a table is not stored in the memory.

When Transporting Papers of Larger Sizes

Here, description is given of a case of printing a paper larger in regard to the transport direction of the paper than a size of a paper for which a correction value table is stored in the memory 63. At this time, it is assumed that correction values corresponding to a size of 101.6 mm×152.4 mm (4×6-size) are stored in the memory 63. And description is given of a case of printing a paper that is 102 mm×181 mm (hereinafter referred to as "high vision-size"), which is a size for which a correction value table is not stored.

Here also correction value tables are generated correspondingly to sizes of other papers from a 4×6-size correction value table. And, here also the line interval is ⅛ inch when transport of the test sheet TS has been carried out ideally as shown in FIG. 24. Furthermore, a table (4×6-size) such as that shown in FIG. 25 is stored in the memory 63. Further still, in regard also to the aforementioned non-ordinary range, ordinary range, and stable range, the same is true as in "When transporting papers of smaller sizes."

Here, when generating a correction value table for a larger size paper based on 4×6-size correction values, the correction value table is generated by interpolating correction values for an amount of stable range correction values that is lacking. Further still, it is arbitrarily determined in advance in regard to which correction values are to be used preferentially in interpolation of the correction values corresponding to the stable range. This is because the values are substantially the same no matter which correction values are used corresponding to the stable range since there is little transport error fluctuation in the stable range. Here it is determined that Ca(14) of the correction values Ca(11) to Ca(18) of the stable range is to be used for interpolation.

Figure 32:
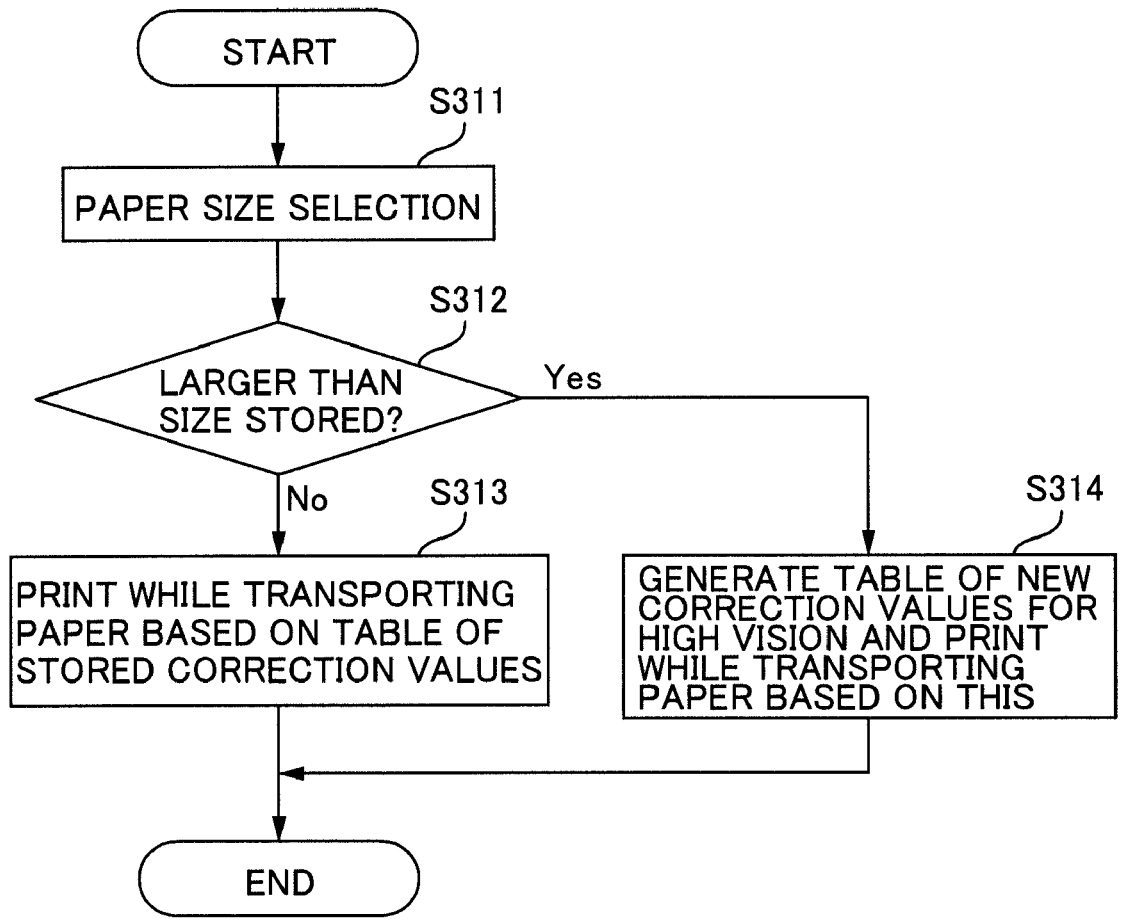
FIG. 32 is a flowchart for describing transport amount corrections in a case where a larger size paper is to be transported.

FIG. 32 is a flowchart for describing transport amount corrections in a case where a larger size paper is to be transported. When an instruction for printing is given from an application running on the computer 110, the computer 110 displays a user interface on the screen and prompts the user to select the size of the paper to be printed. In response to this, the user selects the size of paper desired to be printed. Data relating to the selected size of paper is sent from the computer 110 to the controller 60 of the printer 1 (S311).

When the data relating to the selected size of paper is sent to the controller 60, the controller 60 determines whether the size of that paper is larger than a size of paper or a same size as that for which a table is stored in the memory 63 (S312). Here, no determination is made in regard to the case where the size of the paper is small, but it is desired that the flowchart for when transporting papers of very small sizes is to be referenced in regard to handling such cases.

A correction value table for the above-mentioned 4×6-size size is stored in the memory 63. Thus, when the selected paper is 4×6-size, the controller 60 carries out printing while correcting the transport error using the correction value table for 4×6-size stored in the memory 63 (S313). It should be noted that the operation by which transport of the paper is carried out while correcting the transport error is the same operation as in the reference example, and therefore description thereof is omitted.

On the other hand, when a high vision-size paper is selected (high vision-size is larger than 4×6-size), the controller 60 generates a high vision-size table such as that shown in FIG. 31 by interpolating the correction value of Ca(14) in the above-described 4×6-size table and carries out printing while correcting transport error based on the high vision-size correction value table (S314). This is carried out in a following manner.

First, let's examine what number of correction values should be interpolated from the 4×6-size size when generating a high vision-size correction value table. Here, the number of correction values to be used is determined for each paper. For high vision-size, 45 correction values Ca are necessary but since there are only 38 correction values Ca for 4×6-size, it is evident that seven correction values should be interpolated in order to fill the lacking portion. Accordingly, here, seven correction values are interpolated when generating a high vision-size correction value table.

Here, as mentioned earlier, it is determined that the correction value Ca(14) is to be used for interpolation. Thus, seven positions toward the trailing end direction from the position L15 corresponding to Ca(14) are interpolated with the aforementioned correction value Ca(14).

FIG. 31 shows a high vision-size correction value table generated based on a 4×6-size table. The newly generated high vision-size correction values here involve the correction value Ca(14) being continued eight times consecutively since Ca(14) is interpolated seven times.

It should be noted that here description was given using 4×6-size and high vision-size papers as a typical example, but the sizes of the papers are not limited to these.

By doing this, a correction value table can be generated for large size papers based on a correction value table for a predetermined size of paper, and therefore paper transport can be carried while correcting transport error even in a case of carrying out printing of a paper size for which a correction value table is not stored in the memory 63.

Second Embodiment

In the foregoing embodiment, there was no change in the paper type even when there was a change in the paper size. Here, description is given regarding a case where transport is to be carried out for a paper of a different type to a paper corresponding to a correction value table stored in the memory 63.

Figure 33:
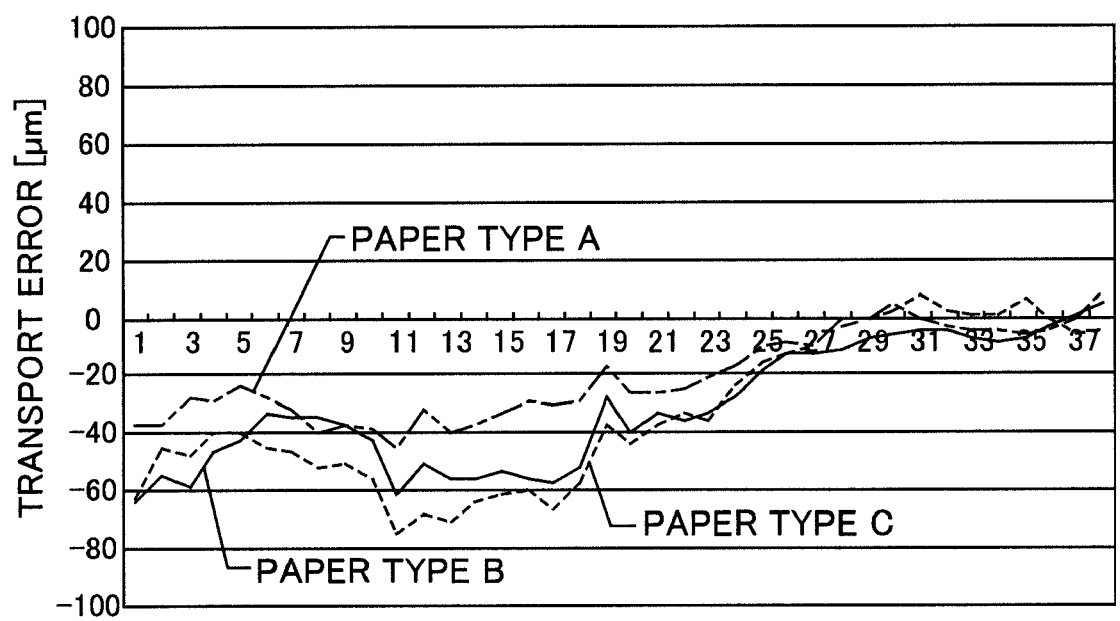
FIG. 33 is a graph showing transport error in regard to a 4×6-size paper type A, paper type B, and paper type C.

FIG. 33 is a graph showing transport error in regard to a 4×6-size paper type A, paper type B, and paper type C. When transport error of these paper types A to C are compared, it is evident that the shapes of their graphs are similar. And it can be read that the shapes are offset upward or downward depending on the paper type. This is because the amount of slippage between the rollers and the paper varies for different paper types such that the transport error varies across the entire surface of the paper.

In this manner, since the transport error amounts are offset overall in a positive or negative direction, it is conceivable that the correction values Ca of the transport amounts will also involve values that are offset overall.

Accordingly, when transporting a paper of a different type to a paper type corresponding to a correction value table stored in the memory 63, corrections of the transport amounts can be carried out for the different paper type also by using correction values that are offset for an amount that is determined in advance.

For example, suppose that a table of correction values Ca for the 4×6-size paper type A is stored in the memory 63. And on the other hand, suppose that no table of correction values Ca' for the 4×6-size paper type B is stored in the memory 63. When an offset amount of correction values from the paper type A to the paper type B is given as OFFSET at this time, the correction values Ca' of paper type B can be obtained thus:

$$Ca'(x) = \text{OFFSET} + Ca(x)$$

In this manner, it is sufficient that an offset amount is stored in advance in the memory 63, and therefore transport can be carried out while correcting the target transport amount even in a case of carrying out transport for a type of paper not stored in the memory 63, and highly accurate transport can be carried out.

Other Embodiments

The foregoing embodiments described primarily a printer. However, it goes without saying that the foregoing description also includes the disclosure of printing apparatuses, recording apparatuses, liquid ejection apparatuses, transport methods, printing methods, recording methods, liquid ejection methods, printing systems, recording systems, computer systems, programs, storage media having a program stored thereon, display screens, screen display methods, and methods for producing printed material, for example.

Also, a printer, for example, serving as an embodiment was described above. However, the foregoing embodiment is for the purpose of elucidating the present invention and is not to be interpreted as limiting the present invention. The invention can of course be altered and improved without departing from the gist thereof and includes functional equivalents. In particular, embodiments described below are also included in the invention.

Regarding the Printer

In the above embodiments a printer was described, however, there is no limitation to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices.

Furthermore, there is no limitation to the use of piezo elements and, for example, application in thermal printers or the like is also possible. Furthermore, there is no limitation to ejecting liquids and application in wire dot printers or the like is also possible.

Overview (1) A printer 1 as a recording apparatus according to the foregoing embodiments is provided with a head for carrying out recording on a medium and a transport unit 20 including a roller at an upstream side (transport roller 23) from the head and a roller at a downstream side (discharge roller 25) from the head. The transport unit 20 transports a paper S in a transport direction in response to target transport amount that are targeted. Furthermore, the printer 1 is provided with a memory 63 that stores a plurality of correction values associated with the relative positions between the paper and the head (more specifically, the relative position between the nozzle #90 and the paper S) in regard to paper of a predetermined size.

Further still, the printer 1 is provided with a controller 60. When carrying out recording on the paper S of the predetermined size, the controller 60 causes a transport mechanism 20 to transport the paper S while correcting the target transport amount using correction values associated with relative positions between the paper S and the head (FIGS. 23A to 23D).

On the other hand, when carrying out recording on a paper smaller than the predetermined size, it causes the transport unit 20 to transport the paper S while correcting the target transport amount such that a portion of correction values among correction values used when the paper of the predetermined size is being transported by both the transport roller 23 and the discharge roller 25 is not used.

By doing this, transport amount corrections can be carried out based on stored correction values for a large size paper even in a case where the medium to be transported is of a size different from that of the paper for which correction values are stored.

(2) Furthermore, in carrying out recording on a paper smaller than the predetermined size, the controller 60 causes the transport unit 20 to transport the paper while correction of the target transport amount is carried out such that among correction values used when transport is being performed by both the upstream side roller and the downstream side roller, correction values (C(11) to C(18)) associated with the relative positions when a downstream side portion of the paper is below the head are not used.

By doing this, a table of correction values matched to the size of the smaller paper can be generated by not using the correction values of the portion where there is little transport error fluctuation. And transport of the paper can be carried out by correcting the target transport amount.

(3) Furthermore, the controller 60 causes the transport unit 20 to transport the paper while correction of the target transport amount is carried out such that among the correction values associated with the relative positions when a downstream side portion of the paper is below the head, a plurality of correction values (Ca(11) to Ca(18)), corresponding to the relative positions, that are consecutive are not used.

By doing this, a table of correction values matched to the size of the smaller paper can be generated by not using the correction values of the portion where there is particularly little transport error fluctuation. And transport of the paper can be carried out by correcting the target transport amount.

(4) Furthermore, the portion of the correction values not used is decided in advance from a relationship between a paper for which transport is being attempted and a paper of the predetermined size stored in the memory 63. For example, in order to generate an L-size correction value table from a 4×6-size paper correction value table, it is decided in advance to delete the correction values Ca(11) to Ca(18).

By doing this, a new correction value table is generated by deleting correction values decided in advance from a correction value table of another medium, and transport of the paper S for which transport is being attempted can be carried out while performing transport amount corrections based on this.

(5) Furthermore, when a type of paper (paper type A to paper type C) for which transport is being attempted is different from a type of paper of the predetermined size stored in the memory 63, the controller 60 adds a predetermined fixed number to the correction values stored in the memory 63 and causes the transport unit 20 to transport the paper S while the target transport amount is corrected based on the correction values after adding.

By doing this, transport of the paper can be carried out while correcting the transport amounts using correction values that are stored of a paper of a different type, even when the type of paper is different.

(6) Further still, when carrying out recording on a paper larger than the predetermined size, the controller 60 causes the transport unit 20 to transport the paper S while correcting the target transport amount such that a portion of correction values, among correction values used when the paper of the predetermined size is being transported by both the upstream side roller and the downstream side roller, are used repetitively.

By doing this, transport amount corrections can be carried out based on correction values stored for a small size paper even in a case where the paper to be transported is of a size different from that of the paper for which correction values are stored.

(7) Furthermore, with respect to each of the correction values, a range of the relative position to which the correction value is to be applied is associated with the correction value. For example, with the above-described correction value Ca(i), the range is associated such that a position (theoretical position) corresponding to the line Li of the measurement pattern is set as the upper end side border position of the applicable range and a position (theoretical position) corresponding to the line Li+1 of the measurement pattern is set as the lower end side border position of the applicable range.

And when the range of the correction value corresponding to the relative position before transport is exceeded when performing transport using the target transport amount, the controller 60 corrects the target transport amount based on the correction value corresponding to the relative position before transport and the correction value corresponding to the relative position after transport.

In this way, DC component transport error, which fluctuates in response to the relative positions of the paper S and the head 41, can be accurately corrected in response to the transport amounts.

(8) Furthermore, the controller 60 performs correction of the target transport amount by weighting the correction values in accordance with a ratio between a range in which the relative position varies when performing transport using the target transport amount and the range of the relative position to which the correction value is to be applied. For example, in a case such as that shown in FIG. 23B, the controller 60 corrects the target transport amount by weighting the correction values Ca(i) in accordance with a ratio F/L of a range F in which the relative position fluctuates during transport and an applicable range L of the correction values.

In this way, DC component transport error, which fluctuates in response to the relative positions of the paper S and the head 41, can be accurately corrected in response to the transport amounts.

(9) Furthermore, as a transport mechanism, the transport unit 20 is provided with a transport roller 23 and transports the paper S in the transport direction by causing the transport roller 23 to rotate. And the correction values are determined based on transport error at a time when the paper S has been transported by causing the transport roller to perform a single rotation, and the range of relative positions to which the correction values should be applied corresponds to the transport amount at a time when the paper S has been transported by causing the transport roller rotate by a rotation amount less than a single rotation. For example, here the range of the relative positions to which the correction values should be applied corresponds to a transport amount of when the paper S has been transported by causing the transport roller to rotate by a rotation amount of ¼ rotation.

By doing this, very fine corrections can be performed on DC component transport error.

(10) Furthermore, with the recording apparatus including all the above-mentioned components, it is possible to attain substantially all of the effects mentioned above, and thus the advantage of the present invention is most effectively achieved.

(11) Furthermore, it goes without saying that transport methods such as the following are also available. Namely, the transport amount correcting method includes a step of determining whether or not correction values associated with the relative positions between the paper and the head are stored in the memory 63 with regard to the paper S of the predetermined size. And further still, a step is included of, when carrying out recording on a medium of the predetermined size, causing the paper S to be transported while the target transport amount is corrected using the correction values associated with relative positions of the paper and the head, and when carrying out recording on a paper smaller than the predetermined size, causing the paper to be transported while correcting the target transport amount such that a portion of correction values among correction values used when the paper of the predetermined size is being transported by both the transport roller 23 and the discharge roller 25 are not used.

(12) Furthermore, it goes without saying that a program is available for operating the foregoing transport amount correcting method on a transport amount correcting apparatus.

What is claimed is:

1. A transport amount correcting method, comprising:
   (A) storing in a memory, in regard to a medium of a predetermined size, correction values associated with relative positions of the medium and a head; and
   (B) when carrying out recording on the medium of the predetermined size, transporting the medium while correcting a target transport amount using a correction value associated with a relative position of the medium and the head, and
   when carrying out recording on a medium smaller than the predetermined size, transporting the medium while correcting the target transport amount by not using a portion of the correction values, the portion of the correction values being a portion of the correction values among the correction values used when the medium of the predetermined size is being transported by both an upstream side roller and a downstream side roller.

2. A transport amount correcting method according to claim 1,
   wherein in carrying out recording on a medium smaller than the predetermined size, the medium is transported while correction of the target transport amount is carried out such that among correction values used when transport is being performed by both the upstream side roller and the downstream side roller, correction values associated with the relative positions when a downstream side portion of the medium is below the head are not used.

3. A transport amount correcting method according to claim 2,
   wherein the medium is transported while correction of the target transport amount is carried out such that among the correction values associated with the relative positions when a downstream side portion of the medium is below the head, a plurality of correction values, corresponding to the relative positions, that are consecutive are not used.

4. A transport amount correcting method according to claim 1,
   wherein the portion of the correction values not used is decided in advance from a relationship between a medium for which transport is being attempted and a medium of the predetermined size stored in the memory.

5. A transport amount correcting method according to claim 1,
   wherein when a type of medium for which transport is being attempted is different from a type of medium of the predetermined size stored in the memory, a predetermined fixed number is added to the correction value stored in the memory and the medium is transported while the target transport amount is corrected based on the correction value after adding.

6. A transport amount correcting method according to claim 1,
   wherein when carrying out recording on a medium larger than the predetermined size, the medium is transported while correcting the target transport amount by repetitively using the portion of the correction values.

7. A transport amount correcting method according to claim 1,
   wherein with respect to each of the correction values, a range of the relative position to which the correction value should be applied is associated with the correction value, and
   when the range of the correction value corresponding to the relative position before transport is exceeded when transporting using the target transport amount, the target transport amount is corrected based on the correction value corresponding to the relative position before transport and the correction value corresponding to the relative position after transport.

8. A transport amount correcting method according to claim 1,
   wherein with respect to each of the correction values, a range of the relative position to which the correction value should be applied is associated with the correction value, and
   correction of the target transport amount is performed by weighting the correction values in accordance with a ratio between a range in which the relative position varies when transporting using the target transport amount and the range of the relative position to which the correction value is to be applied.

9. A transport amount correcting method according to claim 1,
   wherein the upstream side roller is a transport roller that transports the medium in a transport direction by rotating,
   each of the correction values is determined based on transport error when the medium has been transported by causing the transport roller to perform a single rotation, and
   a range of the relative position to which the correction value is to be applied corresponds to a transport amount of when the medium has been transported by causing the transport roller to rotate by a rotation amount of less than one rotation.

10. A recording apparatus, comprising:
    (A) a head for carrying out recording on a medium;
    (B) a transport mechanism including a roller at an upstream side from the head and a roller at a downstream side from the head, the transport mechanism transporting the medium in a transport direction in response to a target transport amount that is targeted;
    (C) a memory that stores, in regard to the medium of a predetermined size, a plurality of correction values associated with relative positions of the medium and the head; and
    (D) a controller that, when carrying out recording on the medium of the predetermined size, causes the transport mechanism to transport the medium while correcting the target transport amount using a correction value associated with a relative position of the medium and the head, and
    when carrying out recording on a medium smaller than the predetermined size, causes the transport mechanism to transport the medium while correcting the target transport amount such that a portion of the correction values among the correction values used when the medium of the predetermined size is being transported by both the upstream side roller and the downstream side roller is not used.

11. A storage medium having a program stored thereon, comprising:
    (A) code for storing in a memory, in regard to a medium of a predetermined size, correction values associated with relative positions of the medium and a head; and
    (B) code for, when carrying out recording on the medium of the predetermined size, transporting the medium while correcting a target transport amount using a correction value associated with a relative position of the medium and the head, and when carrying out recording on a medium smaller than the predetermined size, transporting the medium while correcting the target transport amount by not using a portion of the correction values, the portion of the correction values being a portion of the correction values among the correction values used when the medium of the predetermined size is being transported by both an upstream side roller and a downstream side roller.

* * * * *